United States Patent
Williams et al.

(10) Patent No.: US 6,985,827 B2
(45) Date of Patent: Jan. 10, 2006

(54) SPEED MEASUREMENT SYSTEM WITH ONSITE DIGITAL IMAGE CAPTURE AND PROCESSING FOR USE IN STOP SIGN ENFORCEMENT

(75) Inventors: David W. Williams, Denver, CO (US); Michael Phippen, Englewood, CO (US)

(73) Assignees: Laser Technology, Inc., Centennial, CO (US); Kama-Tech (HK) Limited, Tsim Sha Tsui Hong Kong (CN)

( * ) Notice: Subject to any disclaimer, the term of this patent is extended or adjusted under 35 U.S.C. 154(b) by 66 days.

(21) Appl. No.: 10/715,617

(22) Filed: Nov. 18, 2003

(65) Prior Publication Data

US 2004/0101166 A1 May 27, 2004

Related U.S. Application Data

(63) Continuation-in-part of application No. 09/812,228, filed on Mar. 19, 2001, now Pat. No. 6,681,195.

(60) Provisional application No. 60/191,171, filed on Mar. 22, 2000.

(51) Int. Cl.
*G06F 15/00* (2006.01)

(52) U.S. Cl. .............. 702/142; 702/143; 702/149; 700/159; 701/117; 701/119

(58) Field of Classification Search ........... 702/142, 702/143, 149; 700/159; 701/117, 119; 340/936, 340/937; 356/5.04
See application file for complete search history.

(56) References Cited

U.S. PATENT DOCUMENTS

| | | |
|---|---|---|
| 5,381,155 A | 1/1995 | Gerber |
| 5,515,042 A | 5/1996 | Nelson |
| 5,529,139 A | 6/1996 | Kurahashi et al. |
| 5,583,765 A | 12/1996 | Kleehammer |
| 5,699,056 A | 12/1997 | Yoshida |
| 5,708,425 A | 1/1998 | Dwyer et al. |
| 5,717,390 A | 2/1998 | Hasselbring |
| 5,734,337 A | 3/1998 | Kupersmit |
| 5,742,699 A | 4/1998 | Adkins et al. |
| 5,793,491 A | 8/1998 | Wangler et al. |
| 5,801,943 A | 9/1998 | Nasburg |
| 5,809,161 A | 9/1998 | Auty et al. |
| 5,831,155 A | 11/1998 | Hewitt |
| 5,852,492 A | 12/1998 | Nimblett et al. |
| 5,938,717 A * | 8/1999 | Dunne et al. ............... 701/117 |

(Continued)

*Primary Examiner*—Michael Nghiem
*Assistant Examiner*—Stephen J. Cherry
(74) *Attorney, Agent, or Firm*—Kent A. Lembke; William J. Kubida; Hogan & Hartson LLP

(57) ABSTRACT

A speed measurement system for measuring speeds of vehicles, capturing images of vehicles, and detecting violation of stop sign and traffic signal laws. The system includes a laser speed detector for determining a speed of a vehicle adjacent a stop sign. When a speed is determined, the detector generates a speed signal. The system includes a camera generally aligned with the speed detector operable to capture and store digital still images of vehicles in memory. The camera is programmed to respond to an image capture signal to generate and transmit a digital image file including a still image of the vehicle targeted by the detector. A portable processor is linked to the speed detector and the camera to first receive the speed signal, to compare the detected speed with a threshold speed, to transmit an image capture signal to the camera, and to receive the image file from the camera.

33 Claims, 7 Drawing Sheets

U.S. PATENT DOCUMENTS 5,948,038 A    9/1999   Daly et al.
5,983,161 A   11/1999   Lemelson et al.
6,041,310 A    3/2000   Green et al.
6,100,819 A *   8/2000   White ........................ 340/933
6,546,119 B2 *   4/2003   Ciolli et al. ................. 382/104

* cited by examiner

SPEED MEASUREMENT SYSTEM WITH ONSITE DIGITAL IMAGE CAPTURE AND PROCESSING FOR USE IN STOP SIGN ENFORCEMENT

CROSS-REFERENCE TO RELATED APPLICATIONS

This is a continuation-in-part of application Ser. No. 09/812,228, filed Mar. 19, 2001, now U.S. Pat. No. 6,681,195 which claims the benefit of U.S. Provisional Application No. 60/191,171, filed Mar. 22, 2000.

BACKGROUND OF THE INVENTION

1. Field of the Invention

The present invention relates, in general, to speed detection of moving vehicles, and more particularly to compact, mobile speed detection systems that provide for accurate speed detection with accompanying image capture, processing, and production at the location of the field portion of the system, such as the present location of the law enforcement vehicle.

2. Relevant Background

Law enforcement agencies and personnel presently use a variety of speed measurement devices to monitor traffic and, more particularly, to identify vehicles that are going faster than posted speed limits. In addition to identifying a speeding vehicle, it has become increasingly common to attempt to capture images of such speeding vehicles and then to use the images to better enforce the speed limits (i.e., use the image as part of a ticketing program). While satisfying some of the needs of the law enforcement agencies, the existing speed measurement and image capture devices have not proven suitable or reliable for many law enforcement agency applications and have created operational problems that hinder the field use of such devices.

Various methods are used to detect the speed of moving vehicles, such as well-known radar systems. More recently, speed detection systems have incorporated lasers to accurately detect the speed of a moving vehicle and also the distance or range of the vehicle from the laser device. In general, laser speed detectors measure the time delay between the transmission of a series of pulses and a reflection of those pulses. The design and operation of laser speed detection and range finder systems may be found in U.S. Pat. No. 5,359,404 entitled "Laser-Based Speed Measuring Device, U.S. Pat. No. 5,652,651 entitled "Laser Range Finder Having Selectable Target Acquisition Characteristics and Range Measuring Precision", and U.S. Pat. No. 6,057,910 entitled "Self-Calibrating Precision Timing Circuit and Method for Laser Range Finder", which are each incorporated herein by reference. Typically, these laser speed detection systems provide accurate measures of a vehicle's speed and are useful for providing onsite speed measurements, e.g., at the location of a law enforcement vehicle, that could then be entered on a ticket by law enforcement personnel.

Improvements have been made to increase the accuracy and usefulness of these laser-based speed detection systems. For example, U.S. Pat. No. 5,938,717 entitled "Speed Detection and Image Capture System for Moving Vehicles", which is incorporated herein by reference, discloses a system for accurately aligning a laser speed detector and for capturing an image of a speeding vehicle with a video camera. The system also provides the advantage of automating the capture of images of speeding vehicles at a predetermined distance from the system and of capturing a set of useful information (e.g., date, time, location, speed limit, detected speed, and the like). A computer system is included in the disclosed system to run a frame grabber program to capture a frame of the video image. The computer system includes a removable data storage device for storing the captured image frames and the associated set of information.

Generally, the system is taught to be operated by placing the system in a selected location to monitor vehicle speeds, such as along a road with the bulky computer system position in the back of a van or other vehicle. The system is initially set up by an operator and then allowed to operate automatically without or with minimal operator control for a certain period of time. An operator then removes the data storage device from the system and takes the data storage device back to a separate office or facility for processing of the captured images (i.e., grabbing a still image from the video) and data with a computer system at the office. In this manner, tickets can be produced by combining the video image with the collected data and then mailing the ticket to owners of vehicles that violated a speed limit by a selected amount (such as 5 miles per hour in a school zone and 10 miles per hour for a highway). A hardcopy of the image may be included with the ticket with the data being overlaid by the office computer system. In some applications, the field computer system, such as a personal computer, includes a monitor to allow an operator to view the collected image and to facilitate entering of field parameters. Additionally, the field computer system may perform some of the processing features (such as overlaying of the set of information on a grabbed frame of the video) and may include a thermal printer to produce copies of the image with the overlaid information at the field unit.

While addressing some of the needs of law enforcement agencies, the video-based laser speed detection systems have not addressed all of the operating problems facing field operators and are not particularly useful in some field applications. For example, the use of frame grabbing with a video camera for image capturing is most effective with a relatively high capacity and higher speed data processing system and large data storage capacity. Typically, the computer requirements are met with a personal computer with central processing unit with a frame grabber PC card installed and associated monitor and keyboard. The combined use of a video camera with a personal computer results in a bulky package that is often costly and is usually physically large, which limits its usefulness in the field. It is not convenient or even practical for a single operator, i.e., law enforcement officer, to quickly deploy the system and then periodically move the entire system or portions of the system without moving the whole vehicle in which the system is positioned. The portability of these video-based systems is further limited by the need for a large number of communication cables and power cords (e.g., generally AC and DC power provided to each component) between the various components.

One of the most significant advantages of a laser-based speed measurement instrument is its ability to narrowly target a single car within a group of cars. However, there is still a need for proof that the detected speed is matched with the correct car. This proof can be provided with the overlaid information if it is accurately synchronized with the proper, grabbed video frame. Of course, this synchronization and combining of information requires additional processing capacity that increases the cost and sometimes the size of the system. Also, the time required to process the information and to print out a hard copy of the produced image limits its desirability as evidence or proof of speeding in the field as enforcement officers demand relatively quick evidential support to be used during the issuance of a speeding ticket.

Hence, there remains a need for a device or system for detecting a speed of a moving vehicle and for capturing an image of the vehicle that provides an accurate determination of the vehicle's speed along with readily accessible proof that the speed has been correctly matched to the proper vehicle. Preferably, such a speed measurement device would be designed for field use (such as inside or outside an operator's vehicle) providing prompt and useful evidence of a vehicle's speed while also being compact, lightweight, and easy to operate. The device would also preferably be useful in various weather conditions, provide protection of collected images and data, and be relatively inexpensive to purchase and operate.

SUMMARY OF THE INVENTION

The present invention addresses the above discussed and additional problems by providing a compact and portable speed measurement and image capture system that combines an accurate laser speed detector with a programmable digital camera and a portable field processor. The portable field processor is configured to allow an operator to enter capture session and system parameters, such as a posted speed limit and a capture speed level, and to receive vehicle speed signals from the speed detector. The portable field processor operates to selectively transmit image capture signals to the digital camera in response to these speed signals (e.g., generates image capture signals when the capture speed level is exceeded). The digital camera is programmed to retrieve a still image of the vehicle from its buffers or memory and create and transmit a digital image file (such as a file compressed per JPEG standards). The portable field processor then writes the speed signal data into the digital image file and displays the combined file on a display screen. The portable field processor can then be detached from the system by a field operator to show the displayed image to a vehicle operator. In one embodiment, a classification sensor is provided to detect whether the vehicle is a commercial vehicle, such as by height measurements, axle counting, weight measurements, and the like, and two distinct capture speed levels are used to effectively capture images of private and commercial speeding vehicles that may have different speed limits.

According to one aspect of the invention, a compact speed measurement system is provided for field or onsite use in measuring speeds of vehicles and capturing images of select vehicles. The system includes a laser-based speed detector for determining a speed of a vehicle in a specific target area. When a speed is determined, the detector generates a speed signal. The system also includes a camera generally aligned with the speed detector operable to capture and store digital-format still images of vehicles in memory. Specifically, the camera is programmed to respond to an image capture signal to generate and transmit a digital image file including a still image of the vehicle targeted by the detector. A portable field processor is communicatively linked to the speed detector and the camera to first receive the speed signal, to process the speed signal and in response transmit an image capture signal to the camera, and to receive the digital image file from the camera.

In a preferred embodiment, the portable field processor includes software to create a combined speed and image data file by modifying the digital image file to include speed data from the speed signal. For example, the digital image file may be a JPEG-format file and the modifying may involve writing the speed data to the header of the JPEG file. The portable field processor includes a display screen and is configured to display the modified digital image file on the display screen. An operator can then operate the field processor to enlarge and/or enhance selected portions of the displayed image (such as to enlarge the license plate portion of the image). The field processor can be readily detached from the system and hand carried to a stopped vehicle to show the vehicle operator the displayed image as proof of their speed. To control the risk of data loss, the system is configured such that the digital camera acts as a charging power source for the field processor, i.e., the camera will stop operating before the field processor loses power thus assuring storage of all captured images.

According to another aspect of the invention, a method is provided for measuring a speed of a moving vehicle and capturing a digital image of the same moving vehicle. The method involves initially positioning and setting up a speed detector and a camera at a location selected by an operator for targeting vehicles moving through a target area. The camera is operated on an ongoing basis to capture or temporarily store a still image of each vehicle passing through the target area. The speed detector operates on an ongoing basis to determine the speed of a specific vehicle in the target area. The speed data including the determined speed is transmitted to a portable field processor. The speed data is processed by the field processor, which responds by transmitting a trigger signal to the camera. The camera receives the trigger signal, responds by retrieving a still image corresponding to the targeted vehicle, and then transmits the still image in a digital image file to the portable field processor.

In one embodiment of the method, several of the functions are synchronized to insure that the captured image is an image of the same moving vehicle that was targeted by the speed detector. This is achieved by determining the speed at a speed measurement time with the detector and operating the camera to store still images during an image timing cycle. Synchronization occurs by operating the field processor to transmit the trigger signal within the timing cycle that also coincides with the speed measurement time.

In another embodiment of the method, the method includes determining the classification of the vehicle, such as with a separate classification sensor (e.g., a height sensor). The classifications may include private or lower weight vehicles, commercial trucks or higher weight vehicles, and other classifications that may be used by governments in establishing differing speed limits (e.g., 55 mph for commercial vehicles and 65 mph for private vehicles). In this embodiment, the processing of the speed data includes first identifying the classification of the vehicle (such as from the combined speed data string including vehicle speed, range of vehicle from speed detector, and the vehicle type) and then comparing the detected speed with the speed limit for that type of vehicle. Vehicle classification in the method may be achieved in many ways. For example, vehicle classification may include sending a signal directly to the field processor from a separate sensor configured to detect vehicle type or classification may include concatenating vehicle type information onto the laser speed detector data string.

In another embodiment of the invention, a stop sign enforcement system is provided in which the portable field processor is configured for traffic sign or signal enforcement, e.g., compliance with stop signs. The portable field processor may include a stop sign or traffic signal software module or otherwise be configured, such as by proper entry of operating parameters for its base operating software, to determine whether a vehicle complies with a traffic sign or signal. In this embodiment, the system includes a laser speed detector and a digital camera that are positioned with a line of sight to a traffic sign or signal, such as a stop sign, and a lane of a road adjacent the sign (i.e., where vehicles are supposed to stop for the sign).

The system may be positioned in front of or behind a traffic sign or signal so as to enforce the sign or signal with a front or rear view of vehicles relative to the signal or sign. The laser speed detector is ranged or used to measure the distance to the sign by aiming it at the back or front of the stop sign or traffic signal. Once the measurement distance is identified, the laser detector (with the aligned and combined camera) is aimed at a center portion of the road lane where enforcement is desired. The portable field processor includes a display for allowing an operator to configure the system for traffic signal enforcement, such as by selecting a stop sign enforcement operating mode (or an automatic capture mode), and to input an enforcement or measurement window (i.e., an area relative to the traffic signal or sign) and/or a capture speed threshold.

The threshold is typically set in the range of 10 to 20 mph (at which point it is unlikely that a vehicle would be able to stop at the sign) or set as percentage of the posted speed limit (such as 50 to 100 percent of the limit of the road lane, e.g., 30 mph in a 45 mph speed zone). The system is then allowed to operate for a period of time automatically capturing and storing vehicles that violate or "run" the stop sign or other traffic signal (such as a railroad crossing or traffic light). System operation includes the detector detecting a speed of a vehicle that enters the detector's enforcement window (e.g., detection typically begins a preset distance beyond (or in front of if detecting from behind the vehicle) the measurement distance, such as, but not limited to, 10 to 20 feet) and transmits a speed data signal to the portable field processor. The processor uses the stop sign enforcement module or internal programs with appropriately set parameters and configuration to compare the detected speed indicated in the signal to the threshold. When the threshold is exceeded, the processor transmits a trigger signal to the camera. The camera then retrieves a digital-format still image (of the same vehicle for which the speed was detected) and transmits this to the processor as a digital image file for combining with the speed data (such as in the image file header) and then later downloading for use in creating a traffic violation citation or ticket. In some embodiments, the image file and speed data are maintained as separate files that are linked or matched or that are later combined.

DETAILED DESCRIPTION OF THE PREFERRED EMBODIMENTS

Figure 1:
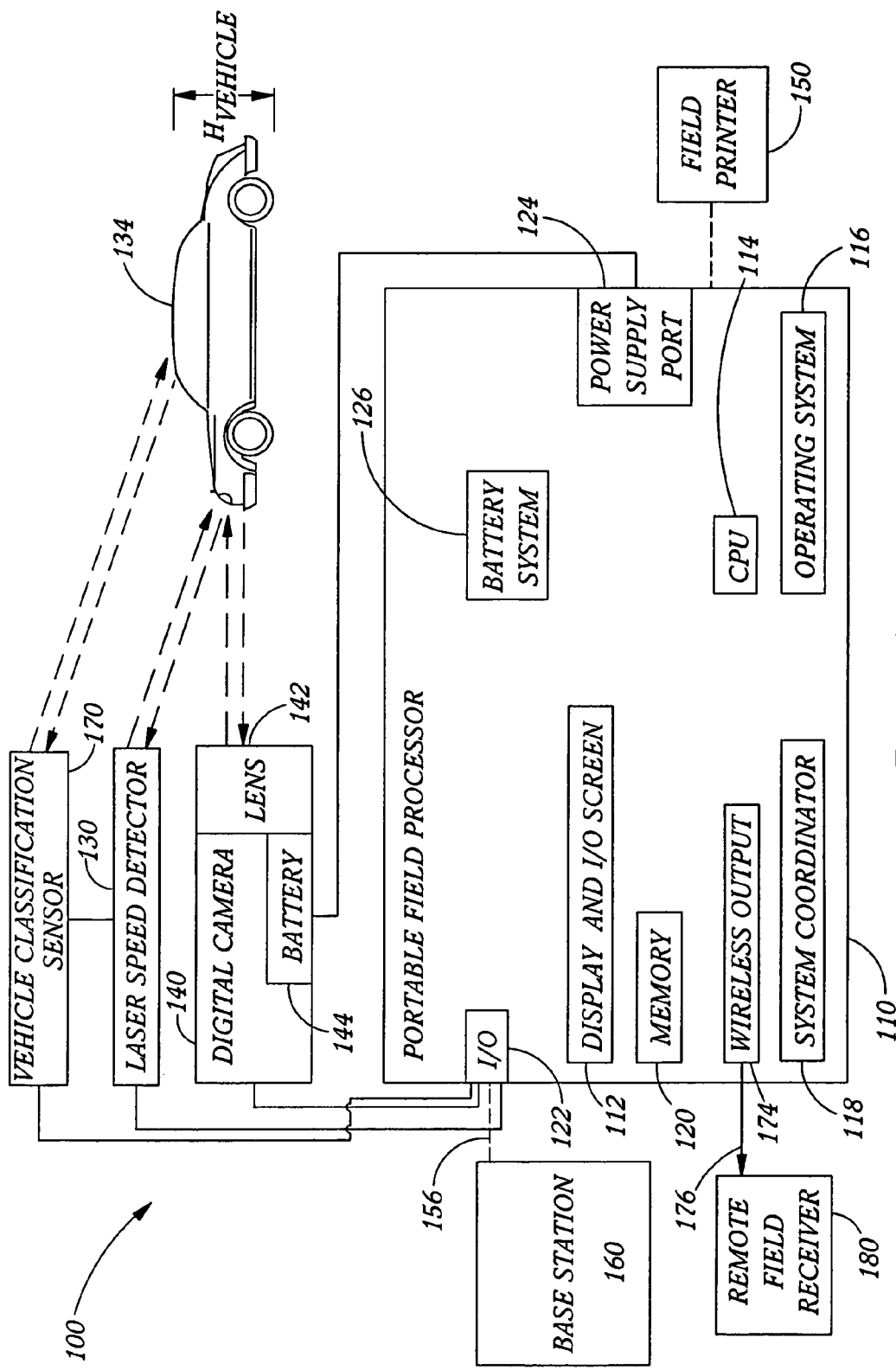
FIG. 1 is a schematic block diagram illustrating an implementation of a speed measurement and image capture system according to the present invention.

FIG. 1 illustrates one embodiment of a speed measurement and image capture system 100 that is especially configured to be used in the field by law enforcement officers. In this regard, the system 100 includes components that can be combined into a compact and portable unit for ready mounting on a tripod or onto a bracket of a vehicle. Significantly, the system 100 also includes a portable field processor 110 that is designed to receive digital information (i.e., captured digital images and detected speeds and ranges), to process the information (such as by zooming in on a vehicle operator's face and/or a license plate on the vehicle), and to be detached from the system 100 to be carried over to the vehicle. The captured and processed image can then be easily displayed to the vehicle operator on a display screen 112 of the portable field processor 110. These and other features, such as the use of a digital camera battery to trickle feed power to the portable field processor 110 to enhance data storage and security, will be discussed in detail below. An overview of the system 100 will first be provided followed by an in depth discussion of the individual components of the system 100 and their operation.

As illustrated, the speed measurement and image capture system 100 includes a portable field processor 110 in communication with both a laser speed detector 130 and a digital camera 140. As will become clear, the laser speed detector 130 is utilized by the portable field processor 110 to obtain a speed of a moving vehicle 134 and the vehicle's range or distance from the detector 130. Concurrently, the digital camera 140 is operated by the portable field processor 110 to capture an image of the front portion of the vehicle 134. During operation, the digital image is combined with the detected speed and range information by the portable field processor 110 for use in proving that a vehicle was going the detected speed (e.g., violating a posted speed limit).

The laser speed detector 130 may be any of a number of laser-based speed and range detection devices that are useful for determining speed and range of a vehicle or other object from the detector 130 at the time the determination was made. Additionally, the detector 130 preferably is configured to provide the determined speed and range information over a communication link to the input/output port 122 of the portable field processor 110 (e.g., in digital form). In one preferred embodiment, the laser speed detector 130 is a laser-based sensor device such as that available from Laser Technology, Inc., Englewood, Colo. under the product name of UltraLyte, which operates effectively to determine the speed and range measurement data and to download the data to the portable field processor 110 (e.g., at a baud rate of 9600 or higher). As shown, the portable field processor 110 includes memory 120 for storing the speed and range measurement data from the laser speed detector 130.

The digital camera 140 is a significant feature of the system 100 providing the key functions of capturing and delivering a digital image when prompted by the portable field processor 110 and of acting as the charging power supply for the portable field processor 110. The digital camera 140 is preferably fully programmable and is selected to create a digital still image on demand and to download the image (e.g., a compressed digital file such as JPEG file) to the portable field processor 110, which can append the speed and range information to the digital image file such as in the JPEG file header.

The digital camera 140 is included to provide the proof that the correct vehicle 134 has been targeted by the laser speed detector 130 by taking or capturing a digital image of the vehicle 134 as the speed is substantially concurrently (i.e., within an acceptable time window, as discussed below) being determined by the detector 130. In other words, the operation of the digital camera 140 and laser speed detector 130 are synchronized by the portable field processor 110. The digital camera 140 includes a lens 142 which is selected such that the camera 140 can capture vehicle images which can be resolved to accurately show the vehicle license plate (and in some embodiments, the vehicle operator's face). The digital camera 140 has a range or field of resolution that preferably coincides with, or is larger than, the target area of the laser speed detector 130 (e.g., a range of 0 to 125 meters or more). The digital camera 140 is powered by an integral battery 144, which is also used to provide power to the portable field processor 110 via power supply port 124 as is discussed in detail below.

As with the laser speed detector 130, the digital camera 140 may take many forms and configurations to provide the features and operational advantages of the present invention. In one embodiment, the digital camera is a high-speed Ethernet camera (such as those available from JVC under Model No. VN-C1U) that is interfaced with the portable field processor 110 with a network card (such as a Compact Flash network card) in the input/output 122 of the processor 110. This type of digital camera is desirable for the camera 140 because it has a high data transfer speed and is programmable but many other digital cameras may be employed in the invention. In one preferred embodiment, the camera 140 is operated in a mode to automatically compress captured images into a JPEG format which reduces the file size of the images prior to them being transferred to the portable field processor 110. The initial setup (e.g., parameter setup) and image capture request communication from the portable field processor 110 to the camera 140 is typically performed via an Ethernet connection (e.g., a 10Base-T Ethernet LAN) with UDP or other protocol to provide a connection rate useful for rapidly downloading the digital images from the camera 140 to the processor 110.

The camera 140 preferably is able to operate in an automatic mode and in a manual mode. In the automatic mode, the camera 140 automatically adjusts the exposure, gain, brightness, and other operating parameters to provide a high quality image. In manual mode, the camera 140 can be adjusted by an operator or by the processor 110 to set a number of operating parameters. For example, the following parameters may be set (with one preferred setting provided in parentheses): image resolution (640×480 pixels); JPEG compression (low or best resolution for camera 140); exposure (1/1000 second); gain (minimum=150, average setting=200, and maximum=255); frame rate (maximum for camera 140 such as 30 frames/second); contrast (default of camera 140); brightness (median setting for camera 140); and sharpness (default of camera 140). Other operating parameters and settings will be apparent to those skilled in the art to obtain a clear enough image to identify a license plate and/or vehicle operator.

In this regard, a number of lens systems 142 may be utilized to obtain a desirable captured image, such as a lens system with a 225-millimeter focal length. In a preferred embodiment, the lens system 142 provides a full field-of-view of 1.5 degrees and is focused at 80 meters to obtain sharp images from 50 to 120 meters. Of course, the focus distance is preferably matched to the target field capacity and setting of the laser speed detector 130. In practice, the only camera 140 adjustment that is manually performed in the field is adjustment of the aperture. Other operating parameters, such as gain, are set by an operator of the system 100 via the portable field processor 110 by entering information in a capture setup screen (discussed in more detail below).

According to one important feature of the invention, the system 100 is configured such that the digital camera 140 functions as a charging power source for the portable field processor 110. This arrangement enables the processor 110 to be fully charged even when the digital camera 140 does not have enough power to continue to operate (i.e., when its battery 144 is depleted) which provides an added level of data protection for previously captured images and speed and range information with data loss being unlikely. This charging feature may be carried out in a number of ways, and the following embodiment is exemplary only and not limiting of the breadth of the invention.

In one embodiment, the camera 144 includes a battery 144 that provides the needed input power for operating the camera 140. For example, the battery 144 may be a readily available 7.2 VDC rechargeable lithium ion battery or other type and rating battery that can be mounted to the camera 140. In some embodiments, the camera 140 operates at a different power level than provided by the battery 144 (or desired by processor 110) and a step-down regulation board (not shown) is mounted between the camera 140 and the battery 144 (e.g., the camera 140 may require 5 VDC input power and the step-down regulation board would be configured to step down the 7.2 VDC to 5 VDC). Further, a switch (not shown) may be provided to break the connection between the battery 144 and the regulation board.

To provide a trickle charge to the processor 110, the stepped-down voltage may be provided to the processor battery system 126. As illustrated, the battery 144 is connected directly to the power supply port 124 that feeds the charging power to the battery system 126 of the processor 110. A step-down regulator (not shown) may be provided in the processor 110. Alternatively, the stepped-down power from the regulation board (not shown) in the camera 140 can be fed through the communication line to the input/output port 122 of the processor 110. For example, the processor 110 power supply wiring may be included in the Ethernet communication wiring from the camera 110 with the stepped-down power (such as 5 VDC) being brought into the processor 110 through the input/output port 122 (e.g., a serial connector port).

Turning now to the portable field processor 110, the system 100 is uniquely configured such that the speed of the vehicle 134 can be accurately determined and an image captured with the detector 130 and camera 140. This data is downloaded to the portable field processor 110, which can be removed or detached from the system 100 and easily carried over to the vehicle 134 by a system operator to display the captured image with the determined speed to the vehicle operator. To achieve these and other functions, the processor 110 includes an input/output port 122 for communicating with the detector 130 and camera 140. The port 122 (e.g., an RJ45 socket) may be configured with a Compact Flash network card, such as those available from Socket (e.g., a Socket, part number EA2902-139 Ethernet card), that in one embodiment is an Ethernet card selected to provide 10BaseT communications with the camera 140. Preferably, the communication cable from the port 122 is ruggedized such that there is no connector to reduce the chance of a communication malfunction during field operations. Of course, the cable connections discussed and illustrated may be replaced with infrared (IR) links between the processor 110 and one or both of the camera 140 and the detector 130.

The processor 110 is preferably a small, handheld computer device or palmtop computer that provides portability and is adapted for easy mounting (as discussed with reference to FIGS. 3 and 4). For example, any of a number of personal digital assistants (PDAs) may be utilized for the processor 110. As illustrated, the portable field processor 110 includes a display and input/output screen 112 for use by the operator in displaying an image and speed and range information to an operator of the vehicle 134.

Figure 2:
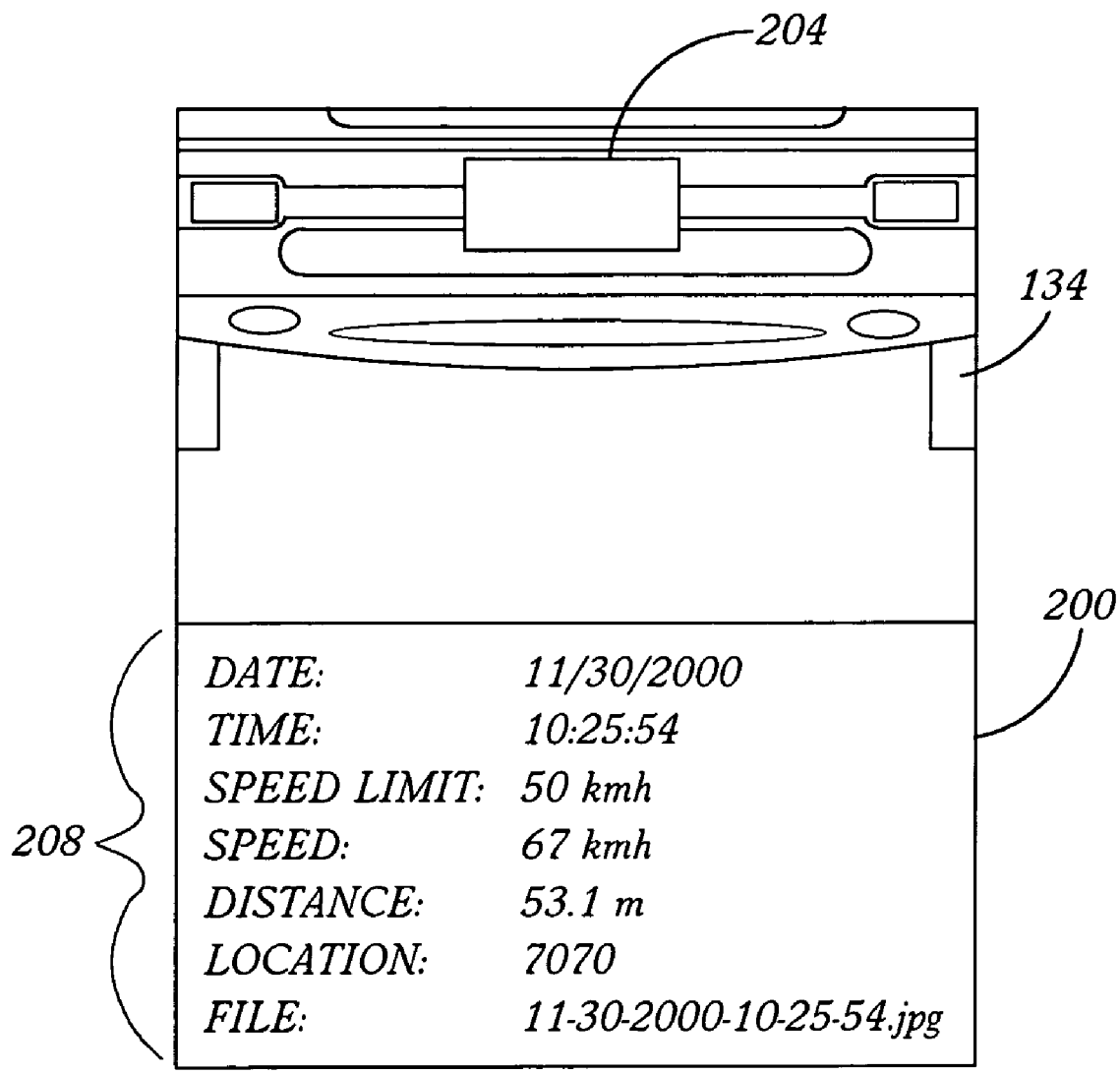
FIG. 2 is an illustration of a display screen of the portable field processor of FIG. 1 as it would be viewed by an operator of the processor and by a vehicle driver.

FIG. 2 illustrates one embodiment 200 of a screen shot displayed on the display 112. The captured image includes an image of the vehicle 134 and in this embodiment, the captured image has been processed by the processor 110 to zoom in or enlarge the portion of the captured image that shows the license plate 204 of the vehicle 134. The collected speed and range data and other operator-entered data (e.g., capture session parameters) are shown in an information section 208 of the screen 112 to provide quick verification that the speed determined has been matched to the correct vehicle 134.

Operation of the processor 110 to process the captured image is discussed below with reference to FIG. 6, and preferably includes the ability to select portions of the captured image received from the camera 140 for modification (e.g., to show clearly the license plate 204 and/or the face of the vehicle operator). While many screen or display technologies may be employed, one embodiment uses a reflective TFT screen that uses sunlight for illumination to enhance outdoor performance. The display 112 is used during operation to enter data (such as camera operating parameters and capture session parameters) and may use stylus, touch screen, and keyboard functions commonly available with PDAs for entering and manipulating data (e.g., selecting items in menus).

The processor 110 includes a central processing unit (CPU) 114, such as a 71 MHz MIPS R4000 or a 206 MHz Intel Strongarm 32-bit RISC processor, to perform the logic, computational, and decision-making functions of the field processor 110 including interpreting and executing instructions. Memory 120 is provided for use during software execution and for storing digital image files from the camera 140, speed and range information from the detector 130, and capture session parameters entered by an operator. In one embodiment, memory 120 comprises 24 or more MB memory with 8 MB for program execution and the remaining 16 MB for data storage. An operating system 116 is provided to manage the basic operations of the field processor 110 and in a preferred embodiment is the Windows™ CE 3.0 or newer operating system available from Microsoft, Inc., Bellevue, Wash. that is configured to support UDP protocol for communicating with the detector 130 and camera 140.

A system coordinator 118, e.g., operating software, is provided to coordinate the activities of the system 100. The system coordinator 118 preferably is configured to allow an operator of the processor 110 to set and modify system operating parameters, to browse previously captured images, and to capture new images of vehicles 134. Numerous programming languages may be utilized, and in one embodiment, the system coordinator 118 is written in Visual C++ and compiled for the MIPS or StrongArm processor 114 and the specific operating system 116 (e.g., Windows™ CE).

As noted earlier, the combination of a digital camera 140 and a laser speed detector 130 with digital data output significantly simplifies the act of combining the speed and range data (and capture session data input by an operator) with the digital image file from the camera 140. This is a large improvement over prior art devices that utilized video-based image capture and then employed a processing hungry and/or time consuming and complex series of steps to overlay the digital information over a captured frame of the video image of a vehicle. Additionally, synchronization of the operation of the detector 130 and camera 140 is simplified by the inclusion of digital photography technology in the system 100. Synchronization is important to accurately match captured images with determined speed and range data.

In one embodiment, the system coordinator 118 achieves the combination of the speed data with the image by inserting the speed and range data into the digital image file header. Alternatively, the combination of data may be completed by and at the digital camera 140. In this embodiment, the laser speed detector 130 is communicatively linked to the camera 140 to receive operating instructions (e.g., range-gate information) from the processor 110 as well as for passing the determined data to the processor 110 via camera 140.

In addition to the speed and range data, a number of other operating parameters and capture session data (such as that illustrated in the screen portion 208) may be inserted in the image file header when the image file is processed and then stored in the memory 120 by the system coordinator 118. In one embodiment, the following information is stored in the image file header: (a) date (which is preferably automatically updated by the processor 110); (b) time (preferably updated automatically by the processor 110); (c) operator name (entered by system 100 operator using a setup screen on display 112); (d) operator ID; (e) capture location (entered by operator using setup screen indicating location for monitoring vehicles 134); (f) determined speed (provided by the detector 130); (g) distance (provided by the detector 130); (h) speed limit (entered by operator using setup screen); X and Y crosshair positions (automatically entered during the alignment process to show detection point of detector 130); and camera ID (entered by operator and may include camera 140 serial number).

The systems coordinator 118 preferably allows the operator to set different modes of operation of the system 100 to selectively store chosen images. In one mode of operation, the operator may select "all" which indicates that during a capture session all speed data for vehicles determined to being going equal to or above the captured speed are stored in a log file in memory 120 for statistical or other uses. The "all" setting may be useful for automated and non-monitored operation of the system 100 (such as setting up the system 100 at a location for a period of time to monitor general traffic patterns and then retrieving the system 100 or the memory 120 at a later time)

To reduce the number of image files (with added header information) stored in memory 120, the operator may enter capture parameters such as a capture level that indicates the amount over the entered speed limit that should be captured. For example, the capture level may be set at 0 mph, and all vehicles 134 determined to be moving at a speed above the entered speed limit are captured. More preferably, a capture level such as 5 or 10 mph is entered to reduce the number of image files captured, processed, and stored in the processor 110 but yet to capture the vehicles 134 that are exceeding the entered speed limit by a level that indicates a citation or ticket should be issued. This mode of operation is suitable for both unmonitored operation and for monitored operation (i.e., in which an operator monitors operation with the capability of stopping a capture session to process and display an image to a particular vehicle operator).

Referring again to FIG. 1, the system 100 may include a field printer 150 to allow the processor 110 to transmit an image print file to the printer 150 to print screen images or other files in the field. For example, a thermal printer can be connected to the serial port of the processor 110 (or to the field processor housing 310, discussed below). Additionally, the system 100 may include a base station 160 in communication via link 156 (a wired or wireless link that may include a direct connection such as by taking the processor 110 to a home office containing the base station 160 or a communications network such as the Internet) to the portable field processor 110. The base station 160 may include one or more computer systems configured with software and processing components to enable the base station 160 to access and process the image files in memory 120 (or alternatively, the memory 120 may be removed and taken to the base station 160). This enables an operator of the base station 160 to browse the image files or to sort the files based on capture sessions and/or speeds (or speed to speed limit differentials) for creation of citations or tickets.

According to a preferred embodiment of the invention, the base station 160 includes software and processing capacity to be able to process the digital image files to enhance the images to improve clarity without modifying the original files. New screen images are created that may include enlarging selected portions of the image (such as the license plate area or operator area of the vehicle 134) and changing the contrast of the image to provide a higher quality picture of the vehicle 134. The base station 160 can then print the enhanced or unenhanced image with all or select portions of the embedded text using any suitable printer.

According to another feature of the illustrated system 100, a vehicle classification sensor 170 is provided that is configured to discriminate between different classifications of vehicles. In many situations, governments enforce two or more different speed limits. For example, in the United States, a 65 miles per hour (mph) speed limit may be enforced for vehicles under a certain height, weight, or axle number (typically, called private vehicles) while in the same location, a 55 mph speed limit is enforced for vehicles over a certain height, weight, or axle number (typically, called commercial vehicles). In these locations, it is useful to first differentiate or classify the vehicles into the classifications used to set and enforce the differing speed limits and then to only capture those that are meeting or exceeding the speed limit (e.g., capture level). Without this ability, the vehicles violating the lower speed limit are typically not captured or a large amount of manual processing is used to eliminate all the vehicles not speeding when the lower speed limit is used as the capture level.

Referring to FIG. 1, the system 100 is shown to include a vehicle classification sensor 170 configured for sensing a characteristic of the vehicle, such as height, weight, axle number, and the like. The sensor 170 may be configured to transmit a signal providing this characteristic data to the input/output 122 of the portable field processor 110 (automatically or upon request from the processor 110). In a preferred embodiment, the vehicle classification sensor 170 is configured to determine the classification of the vehicle and to then transmit the vehicle type information to the portable field processor 110. This vehicle classification signal may be sent directly or the information may be concatenated with the laser speed detector 130 speed data (e.g., the combined data string may include vehicle speed, vehicle range from detector 130, and vehicle type).

While many vehicle sensor configurations may be utilized to practice this feature of the invention, the illustrated sensor 170 is useful for sensing the height, $H_{VEHICLE}$, of the vehicle 134. In this regard, the sensor 170 typically is mounted and aligned within the system 100 to sense when a vehicle 134 is at or above a height limit, such as 6 to 9 feet (i.e., whatever vehicle height is used by the government for setting the lower speed limit).

The portable field processor 110 then processes the vehicle type information along with the vehicle speed data to determine if an image should be captured. For example, the portable field processor 110 may be configured to first identify the vehicle type or classification and then retrieve from memory 120 a vehicle speed limit for the classification. In a more preferred embodiment, the operator of the portable field processor 110 inputs capture levels for each possible vehicle classification. In this embodiment, once the processor 110 identifies the vehicle classification from the signal from the sensor 170, the processor 110 compares the received vehicle speed with the appropriate capture level to determine if an image should be captured. In this manner, the system 100 enables effective and accurate vehicle classification and capture of speeding vehicle images in locations having more than one enforced speed limit.

According to another useful aspect of the system 100, the portable field processor 110 may be configured to transmit wireless signals to remote field locations to enhance speed enforcement. In practice, the portable field processor 110 and the digital camera 140, and the detector 130 may be positioned to capture images of speeding vehicles at a first location on a road while the enforcing officer may be positioned at a second location remote from the processor 110, such as 100 to 200 meters or further down the road from the processor 110. With this positioning, the enforcement officer can be informed with a signal from the processor 110 of an approaching speeding vehicle 134 and more importantly, be provided with the combined vehicle speed data and image file for use in stopping and ticketing the vehicle 134.

In this regard, the portable field processor 110 is shown in FIG. 1 to include a wireless output 174 for transmitting a wireless signal 176 to a remote field receiver 180. As discussed above, the wireless signal 176 preferably includes the combined speed data and image file (explained in detail previously). The remote field receiver 180 may be any wireless device configured for receiving a wireless signal, and in one embodiment, is a device similar to the portable field processor 110 that is useful for processing and displaying the captured image and speed data to an operator of a vehicle 134. A thermal printer may also be used at the remote location to print out hard copies of the image and speed data. A number of well-known wireless network devices and technologies can be utilized for the wireless output 174. Similarly, a number of digital wireless protocols may be used, such as CDMA, GSM, iDEN, CDPD, and Bluetooth.

Figure 3:
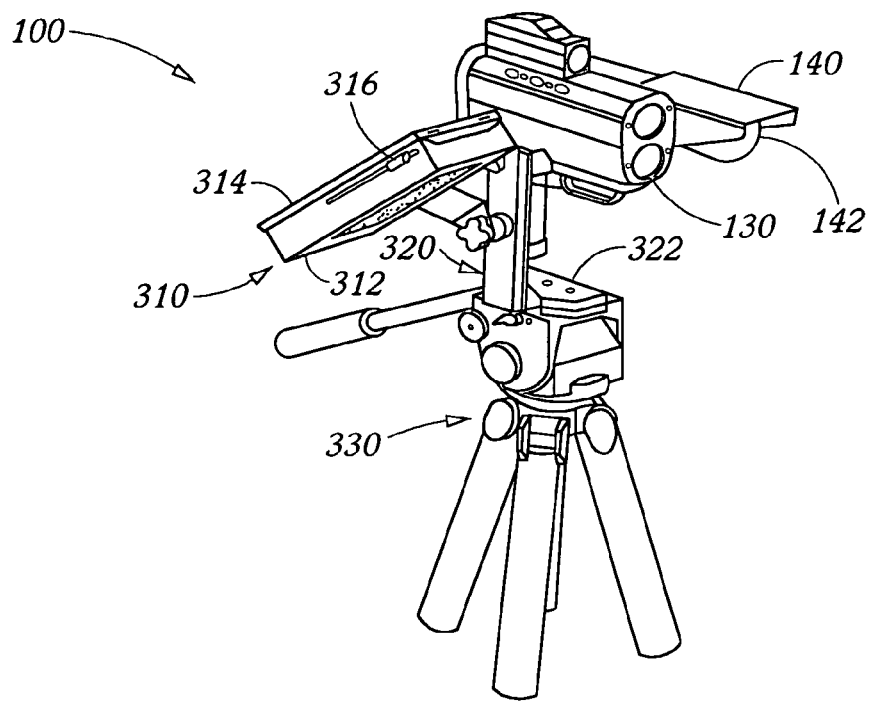
FIG. 3 is front perspective view of an embodiment of the speed measurement and image capture system of FIG. 1 illustrating the compactness of the system as the entire system is mounted on a standard photographers tripod.
Figure 4:
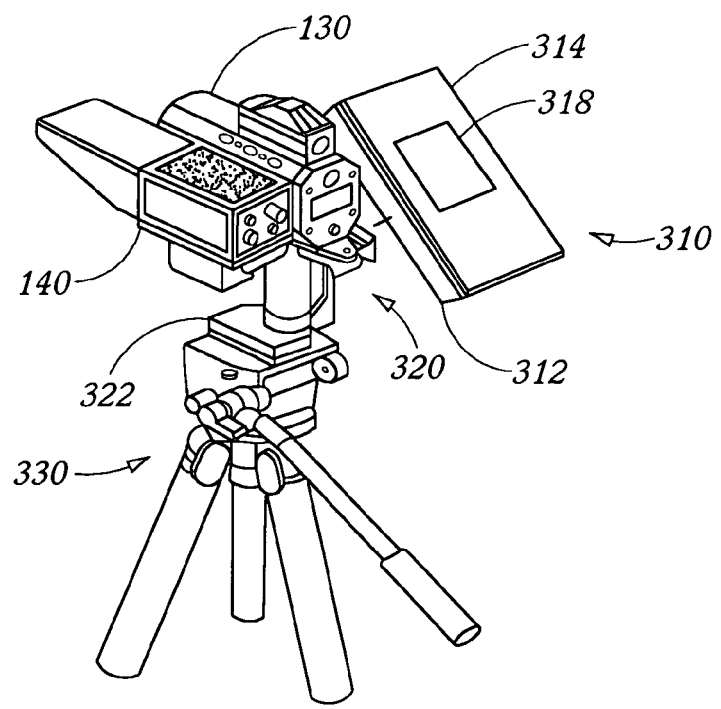
FIG. 4 is a rear perspective view of the system of FIG. 1 similar to FIG. 3 illustrating the operator's view of the system and showing the field processor housing for holding and viewing the portable field processor.
Figure 5:
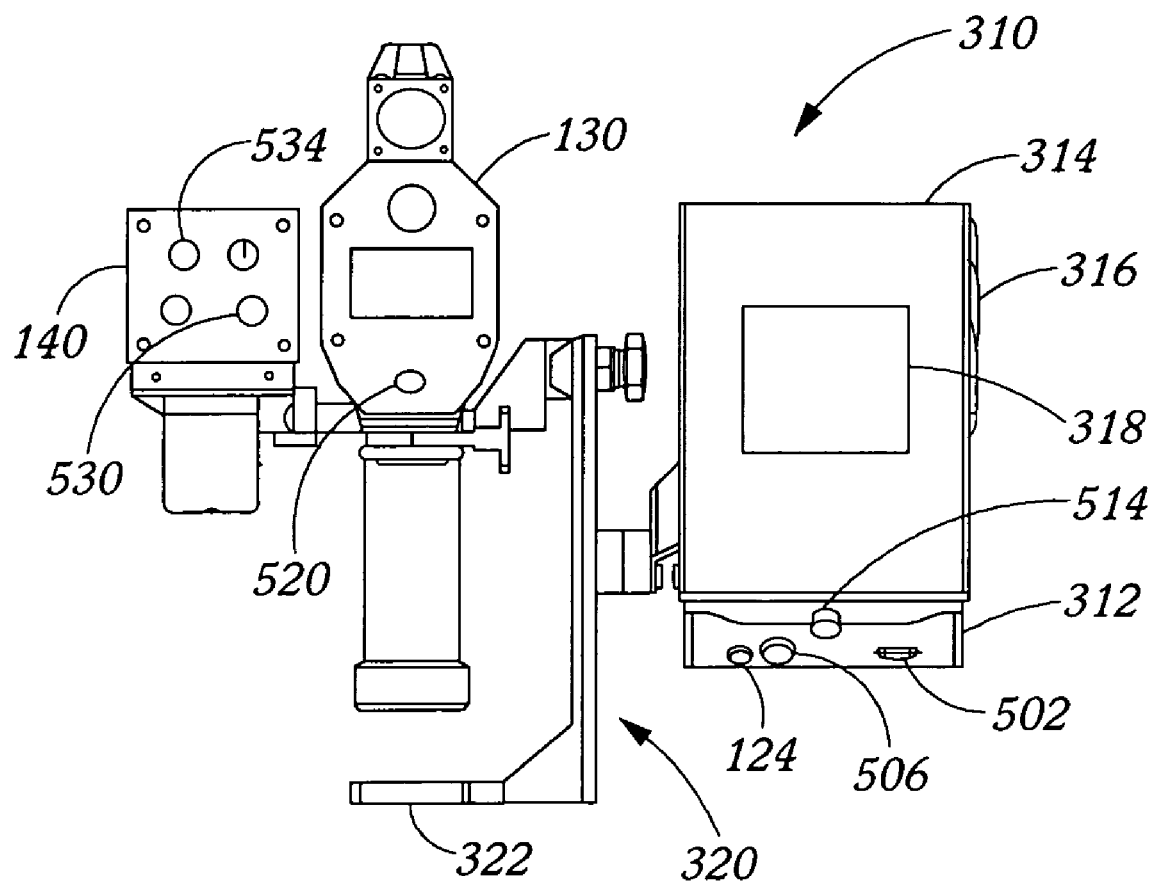
FIG. 5 is rear side view of the system of FIGS. 3 and 4 illustrating the detachable mounting bracket and the communication and power ports or connections of the system components.

Referring now to FIGS. 3–5, one embodiment of the speed measurement and image capture system 100 is illustrated that clearly shows the compact and portable nature of the system 100 that is achieved, at least in part, through the combined use of the digital camera 140 and the portable field processor 110. As shown, the system 100 can readily be mounted on and supported by a standard tripod 330 (such as a photographer's tripod). Due to the lightweight and compact characteristics of the system 100, the system 100 alternatively can be simply hand-held by an operator, be mounted on a number of stand arrangements besides the illustrated tripod 330, or be mounted directly to a vehicle with the use of a receiving bracket (not shown) attached to the vehicle.

As shown in FIGS. 3–5, the system 100 is mounted to the tripod 330 utilizing system mounting bracket 320 in a manner that balances the system components to enhance stability. Additionally, the mounting bracket 320 includes a quick release plate 322 that is configured to engage the tripod 330 such that the plate 322 can be mounted rapidly and optionally fastened to the tripod 330 to lock the plate 322 in position. In the illustrated embodiment, the plate 322 is configured to slide into grooves in the tripod 330 and fasteners can be inserted through holes in the plate 322 to rigidly attach the bracket 320 to the tripod 330.

To distribute the weight of components and enhance stability, the illustrated bracket 320 is adapted to facilitate mounting of the detector 130, the digital camera 140, and the field processor 110 (along with any protective housing 310) on the tripod 330 (or other support structure) such that the mounted system 100 is stable. Further, it is preferable that the mounted system 100 remain relatively stable with or without the field processor 110, as a key feature of the invention is being able to remove the field processor from the system 100. Many alternative arrangements can be envisioned for maintaining a stable mounting of the system 100 on a bracket 320, and these alternative mounting arrangements are considered within the breadth of this disclosure.

In the illustrated embodiment, the bracket 320 is configured such that the typically heavier detector 130 is mounted substantially above the quick release plate 322. This enhances the stability of the mounted system 100 by placing the heaviest component on or substantially on a central axis of the tripod 330 (or on an axis passing through the center of gravity of the tripod 330). The digital camera 140 is then mounted on the bracket 320 adjacent a first side of the detector 130 and a field processor housing 310 for housing the processor 110 is mounted on the bracket 320 adjacent a second side of the detector 130. This configuration provides weighted stability for the mounted system 100 with the processor 110 positioned within or removed from the housing 310.

Additionally, mounting the camera 140 to the same bracket 320 as the detector 130 facilitates mechanical alignment of the two components such that captured vehicle images more readily correspond to the vehicles 134 for which speed is detected. When the camera 140 is attached to the bracket 320 (or the portion or arm of the bracket 320 that is supporting the detector 130), the camera 140 can be adjusted vertically and horizontally to be substantially parallel with the sighting device of the detector 130. Alignment can be achieved by first sighting the detector 130 on a stationary object and then second sighting the camera 140 on the same object (or in opposite order). Once mechanically aligned, the two devices 130 and 140 are preferably locked in place, such as with fasteners, such that alignment is only required upon initial set up. Final alignment (or refined camera targeting) of the camera 140 is preferably achieved with the systems coordinator 118 of the processor 110 which can operate to position digital image crosshairs onto a specific feature of a sighted object. The crosshairs indicate the detection location of the detector 130 on an image captured by the camera 140.

As discussed with reference to FIG. 1, the detector 130 and camera 140 communicate with the portable field processor 110. As shown, the detector 130 includes a communication port 520 and the camera 140 includes a communication port 530 (although in some applications IR links may be utilized). Standard communication cables (not shown) are then used to connect the detector 130 and camera 140 to the communication port 502 (illustrated as a serial port) of the field processor housing or enclosure 310. The portable field processor 110 (not shown in FIGS. 3–5) is positioned or plugged into the base 312 of the housing 310 to provide for communication with the detector 130 and camera 140 (as discussed with reference to FIG. 1). A protective cover 314 is provided that can be open, such as with hinges, to allow access to the interior portion of the base 312 for insertion and removal of the processor 110 during operation of the system 100. In this manner, the processor 110 is protectively housed in the housing 310 with docking for communication with the detector 130 and camera 140 but yet can readily be detached or unplugged from the housing 310.

The protective cover 314 includes a viewing window 318 to allow the cover 314 to be closed to protect the processor 110 from weather and dust during field use of the system 100. To enter data, the cover 314 is typically opened to provide access to the display 112 of the processor, and for use with many processor 110 configurations a stylus holder 316 is provided on the side of the base 312 to hold the stylus-type data input tools provided with palmtop computers and PDAs. An optional cover locking knob 514 is provided to lock the cover 314 in the closed position.

Preferably, the camera 140 also provides charging power to the processor 110. As illustrated, the camera 140 includes a power outlet port 534 which is connected with a cord (not shown) to the power supply port 124 of the housing 310 and processor 110. In another preferred embodiment, the trickle charging power is provided over the communication cable and fed into the processor 110 over a standard communication port (e.g., serial port 502). In this embodiment, only one cable is needed to transfer data (i.e., digital image files and parameter data) between the camera 140 and the housing 310 and to transfer power from the camera 140 to the housing 310. The single cable would connect the communication port 530 of the camera 140 to the communication port 502 of the housing 310 (which in turn, is connected to the communication port, typically a serial port, of the processor 110 when the processor 110 is docked within the housing 310). Also, as discussed with reference to FIG. 1, in some embodiments a short communication cable (not shown) is used to communicatively link the detector 130 to the camera 140 to reduce the length of cabling required. In this embodiment, the processor 110 exchanges data with the detector 130 through the camera 140 communication cable and port 530.

Figure 6:
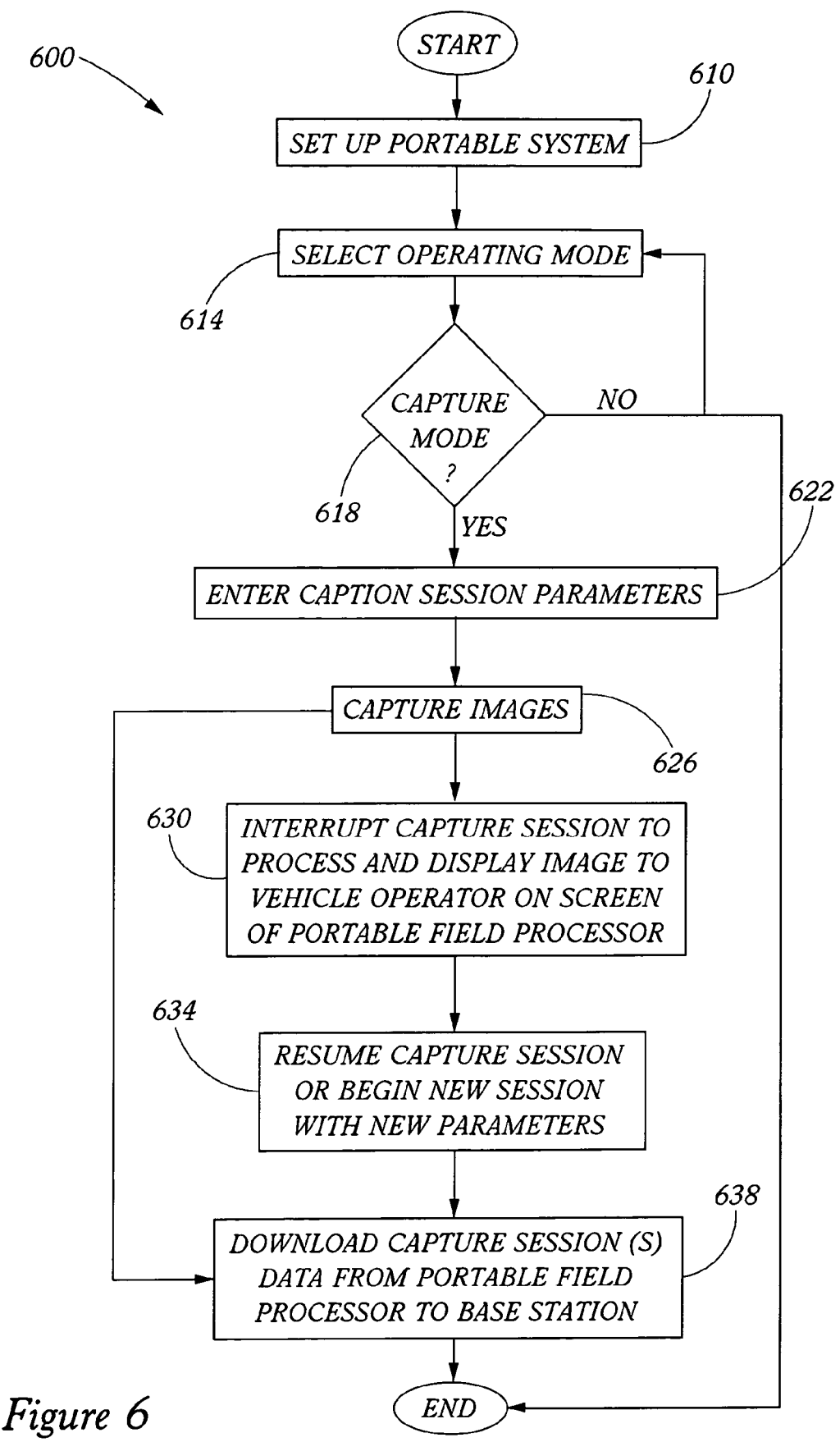
FIG. 6 is a flow diagram illustrating the acts and features of operating the speed measurement and image capture system to capture and process images and then display the images to a vehicle operator with a portable field processor.

Referring now to FIG. 6, operation of the speed measurement and image capture system 100 will be discussed to provide a further understanding of the unique features of the invention. At 610, the operation process 600 is started with initial set up of the portable system 100. Initial set up may involve numerous steps such as the mounting of the system 100 on the bracket 320 and/or tripod 330, but generally involves selecting a capture session location in which to monitor vehicle traffic (such as adjacent a road within the system's targeting area and with the sun striking the rear of the detector 130 and camera 140 to control glare and to better illuminate license plates) and setting up, connecting, and powering up the components of the system 100. A portion of a road may be targeted and vehicles automatically targeted and/or captured as they cross into the capture area or target line or alternatively, an operator may target manually specific vehicles by changing the position of the system 100 (e.g., turning the system 100 on the tripod 330).

At 614, the operator is requested via a menu or other data entry device on the display screen 112 of the processor 110 to select an operating mode. A number of operating modes may be included for operation of the system 100 such as a browse mode that allows the operator to view previously captured images and a system mode that allows the operator to enter or modify system settings (such as adjusting the camera 140 settings, the detector 130 settings, the images to be logged or stored (such as only vehicles above a capture limit indicating speeding) and the like). If these modes are selected, once the operator is finished entering information or viewing (and processing and printing) images, the process 600 ends at 618. To capture new vehicle images and speeds, the operator at 614 selects capture mode (or continue previous capture mode) and at 618 the process 600 is continued.

At 622, the operator is requested via a data entry screen on the display 112 to enter capture session information or parameters. A portion or all of these parameters will then be inserted by the system coordinator 118 into the captured image file (such as in the header of a JPEG file) for inclusion in the captured image files stored in memory 120 and/or shown to vehicle operators. A wide variety of parameters may be included but in one embodiment, the parameters include an operator name, an operator ID, a capture session location, the posted speed limit for the location, the capture level or capture speed limit (i.e., a speed value for which the system 100 will capture an image when the determined speed by the detector 130 is greater than or equal to the speed value), weather conditions (which in some embodiments is used by the system coordinator to automatically determining camera 140 settings such as camera gain), and the camera 140 serial or identification number.

At 626, the capture session is begun. The system 100 is either positioned to automatically detect vehicles 134 that enter a target area or the operator of the system 100 may move the system 100 to target particular vehicles 134 (such as by turning the upper portion of the tripod 330). When a targeted vehicle's speed and distance from the detector 130 are determined by the detector 130, this information is transmitted to the processor 110 (e.g., via a communication connection such as RS232). The system coordinator 118 compares the determined vehicle's speed with the entered capture level or capture speed limit for the capture session. If the determined speed is less than the capture speed limit, no image is taken, i.e., the camera 140 is not operated to capture an image (unless all images and speeds are being logged for monitoring traffic patterns). If the determined speed is equal to or greater than the capture speed limit, the system coordinator 118 of the processor 110 transmits an operational signal to the camera 140 to trigger the camera 140 to capture an image of the vehicle 134. The camera 140 retrieves the current digital image file from its memory and downloads the digital image file (e.g., a JPEG file) via the Ethernet or other connection to the processor 110.

The image capture step 626 may also include first classifying the vehicle 134 into classifications, such as private and commercial, used by a government agency for establishing two or more speed limits (e.g., capture levels). This classification is performed by the processor 110 or the vehicle classification sensor 170 based on detected information by the sensor 170 (such as vehicle being above a certain height, above a weight limit, or having more than a set number of axles). The processor 110 then acts to first retrieve or identify the classification of the vehicle and then compare the vehicle speed with the appropriate capture level.

Within the image capture process 626, it is important to synchronize image capture by the camera 140 with detection of speed by the detector 130. Typically, laser speed detectors 130 operate on a measurement cycle as measured from the start of individual laser shots or transmissions to the calculation of the speed and distance. A typical laser speed gun or device may have a measurement cycle of about 300 milliseconds to 400 milliseconds (with some devices having shorter and some longer cycles). The speed and distance data are transmitted to the processor 110 at the end of this measurement cycle. Hence, the time from the start of the measurement process to the export of the data is at least about 300 milliseconds and typically less than about 400 milliseconds.

To achieve synchronization, the digital camera 140 is preferably programmed such that the image is not taken for a time period greater than the shortest portion of the detector measurement cycle (i.e., about 300 milliseconds for the above illustrative examples). Also, a maximum latency time (i.e., time between triggering signal received at camera 140 and taking picture) is selected such that the detector 130 would most likely not have been aimed at a new target or automatically tracked on a new target vehicle. In one embodiment, a maximum latency time of 200 milliseconds is utilized, but it is understood by the inventors that smaller and larger latency times may be selected to provide acceptable synchronization of the camera 140 and detector 130. In this embodiment, an image capture window is established that begins at about 300 milliseconds before the end of the measurement by the detector 130 and that ends at about 200 milliseconds after the trigger signal to the camera 140.

With this image capture window established, the camera 140 is preferably programmed in combination with operation of the system coordinator 118 (which transmits the camera trigger signal) such that the camera timing cycle coincides with the image capture window to place an image frame containing the vehicle 134 for which speed was measured within the memory of the camera 140. The camera timing cycle in one embodiment is approximately 200 milliseconds with the image frame being placed in memory as early as 100 milliseconds prior to the end of speed measurement by the detector 130 and as late as 100 milliseconds after the end of speed measurement.

This timing cycle is obtained by the systems coordinator 118 adding a time delay, such as 100 milliseconds, from the time the detector 130 completes and transmits the speed measurement to the processor 110. Another phase of the timing cycle is established by the camera 140 which updates a compressed image into alternating buffers periodically, such as every 200 milliseconds. If the camera trigger signal is received just before the next update, the image would be 200 milliseconds old (or 100 milliseconds prior to the end of the speed measurement). Conversely, if the camera trigger signal is received as soon as the buffer is updated, the image is frozen immediately (or 100 milliseconds after the end of the speed measurement). Of course, those skilled in the art will understand that the camera timing cycle, the image capture window, the timing of the camera trigger signal, and the speed measurement cycles will vary with particular components chosen for the system 100 and with the programming and operating setting of each component. These variations are acceptable in practicing the invention as long as the image capture and speed determination events can be adequately synchronized such that the same vehicle is captured in an image file and is targeted for speed determination.

As discussed with reference to FIG. 1, a significant feature of image capture is the combination of the image file from the camera 140 with the speed and distance data from the detector 130 and other system and/or capture session parameters. Typically, the data combination is completed at the processor 110 by the system coordinator 118 which functions to write or insert the speed and distance information into the header of the image file (e.g., JPEG-formatted file). The system coordinator 118 also writes select portions of the system parameters (such as time and date) and capture session parameters (such as location, speed limit, and operator ID) into the digital image file header. Generally, after the digital image file header is modified or the information is otherwise appended to the digital image file, the modified digital image file is displayed on the display 112 of the processor 110 for viewing by the operator.

In one preferred embodiment, the operator at 626 can operate the processor 110 to zoom in or enlarge select portions of the displayed image file. For example, the operator may select the license plate portion or the driver's side of the windshield to enlarge one of these portions of the displayed image. Various image enhancing tools may also be provided in the processor 110, and if included, the operator can enhance the image by altering the displayed contrast, brightness, and other characteristics useful to make a clearer and sharper image.

In some applications, the system 100 is allowed to operate for a period of time automatically capturing images of vehicles (all or only those above the capture limit) and combining speed and distance image and select system parameters with the digital image files. These captured and modified digital image files are then stored in memory 120 for later viewing and processing. This later viewing and processing can occur in the field via the processor 110 and/or the optional field printer 150. Alternatively, at 638, the images stored in the memory 120 (i.e., capture session data) are downloaded from the processor 110 to a base station 160. The downloading may be completed remotely over a communications network 156 or directly by interconnecting the processor 110 to a computer system within the base station 160 or by removing the memory 120 for use in the base station 160. At the base station 160, the combined image files can be sorted by determined speeds, by differentials between determined speeds and speed limits, by location, or by other information appended to the image file (e.g., inserted in the image file header). The images may also be processed to enhance picture quality and to enlarge select portions of the image. The electronic or hard copies of the processed images may then be used as part of a citation or ticket transmitted to the vehicle owner or operator.

Alternatively, according to a significant feature of the system 100, the portable field processor 110 may be used by an operator to provide proof in the field that a vehicle was violating a posted speed limit. At 630, the operator may interrupt an active capture session. For example, an operator may observe the displayed image on the display 112 of the processor 110 and when a speeder is displayed (above capture limit or by visual identification by the operator), the operator may stop the capture session to pull over the vehicle and issue a ticket. Alternatively, the system coordinator 118 may be adapted to provide an audio and/or visual alarm when a vehicle is detected to be driving at or above the capture limit and its image is captured. At this point, the operator detaches or unplugs the processor 110 from the housing 310 and carries the processor 110 to the stopped vehicle. The operator can display the captured image with combined data to the vehicle operator on the display 112.

Alternatively, at 630, the captured speed data and digital image may be transmitted to a receiver operated by a remotely positioned field operator (law enforcement officer). The field operator can then process the information with their equipment, such as another portable field processor 110, and stop an approaching vehicle shown in the captured image. The field operator can then display the image to the operator of the vehicle 134 as described above.

The operator of the system 110 may process the captured image to enlarge the license plate or the driver's face and to enhance the clarity of the displayed image. When the operator has completed using the processor 110 to prove a vehicle's speed to a driver, the operator docks the processor 110, located in the housing 310, to its bracket. At 634, a new capture session may be begun (returning to step 610) or the previous capture session can be resumed without having to reenter capture session parameters. After the session is completed, the capture session data can be downloaded to the base station at 638 for further processing.

In one embodiment, a data security process is performed by the system coordinator 118 prior to writing the combined data image file to memory 120 to ensure that the image and/or speed data is not altered between the time it is collected and the time it is used in a citation or as evidence. A number of security processes may be utilized to indicate whether a data file has been altered. For example, the system coordinator 118 may perform a check sum on the data with a seed number in the header of the combined speed data and digital image file, encrypt the check sum, and append the encryption into the header of the file. Then when a saved image file is opened, it is first verified as not being altered by removing the encrypted check sum and replacing the check sum with a seed number. The same type of check sum is run on the file and the new check sum is encrypted. The two encrypted check sums are then compared to determine if alteration has occurred. Of course, numerous other security processes may be utilized to reduce the risk of data modification but the exemplary method has proven effective and is detailed enough to detect an alteration as small as inverting speed digits (e.g., changing 75 mph to 57 mph). Note, in some embodiments, security is further enhanced by verifying with the processor 110 the check sum output directly by the laser speed detector 130 with an expected check sum value.

In addition to enforcement of speed limits, it is desirable to provide a system and method for identifying vehicles that violate traffic signs and signals, such as stop signs, traffic lights, and other postings or traffic devices that require a vehicle to come to a stop at a particular location. Such signals may vary based on the traffic laws of a country or locale, but in the United States, stop signs and traffic signals are typically placed at corners where one road intersects another road. To comply with the posted stop sign, an operator of a vehicle is required to come to a complete stop, i.e., a vehicle speed of 0 mph, for a period of time. Similarly, a traffic light when showing a red light requires a vehicle operator to stop their vehicle until the traffic light changes to show a green light. Other postings, traffic signs, or signals may likewise require a vehicle to stop at a particular location, such as certain railroad crossing signs or signals (e.g., at blind crossings) that require all vehicles to stop prior to crossing over the railroad tracks.

For these and other stop "signs" (e.g., the use of stop signs in this application is intended to include any and all devices used to cause a vehicle to stop such as printed stop signs, traffic lights, certain railroad crossing signage, and the like), it is desirable to be able to detect violations, i.e., vehicles that fail to stop, and to capture enough information to create a valid citation for the violation (such as an image of the front or rear of the vehicle with a license plate and/or an image of the vehicle driver) as discussed with reference to FIGS. 1–6.

Figure 7:
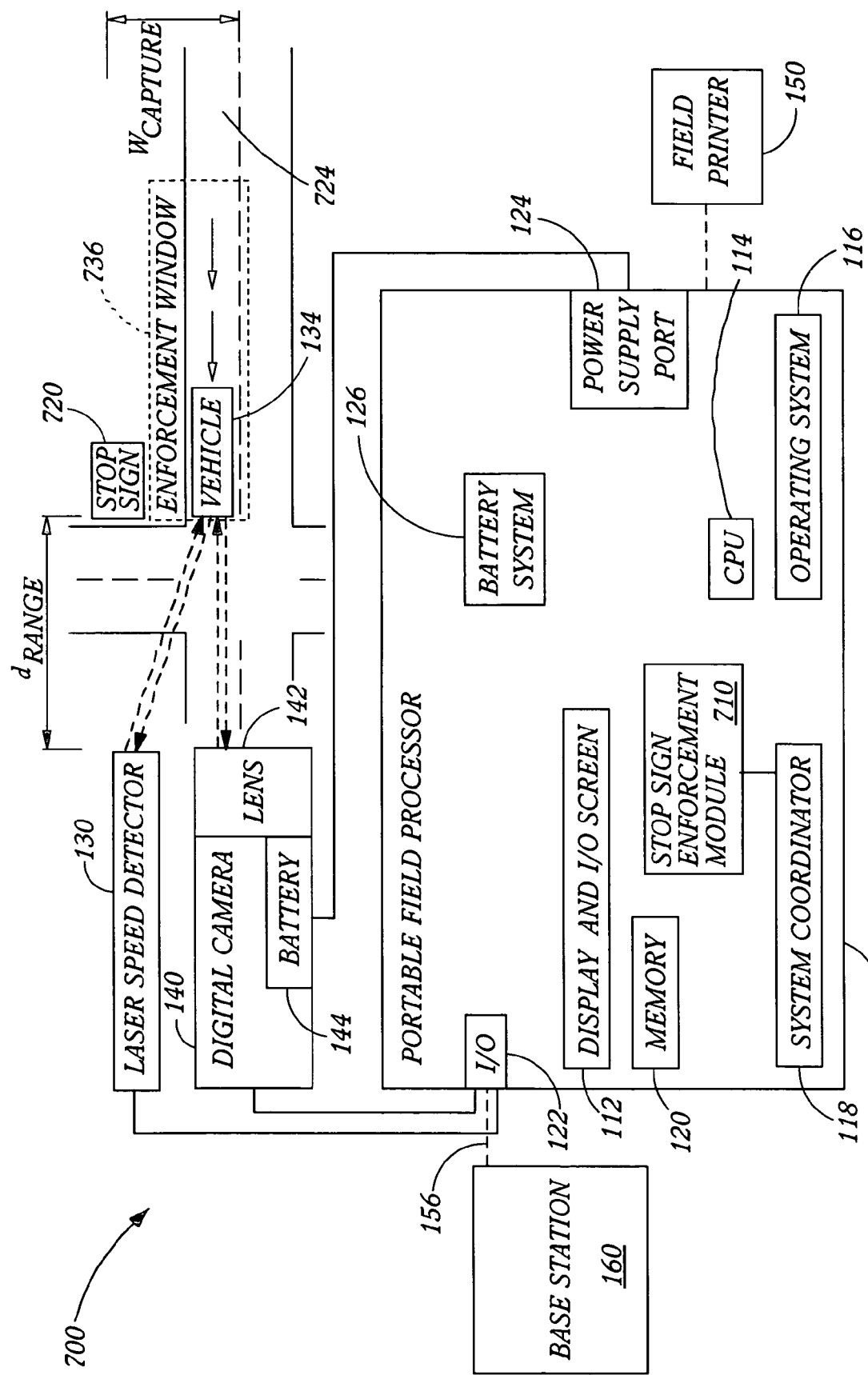
FIG. 7 is a schematic block diagram illustrating another implementation of a speed measurement and image capture system according to the present invention that is configured more specifically for stop sign (or signal enforcement).

In this regard, FIG. 7 illustrates a stop sign (or traffic signal) enforcement system 700. In the system 700, many of the components of the system 100 of FIG. 1 are included and provide similar functionality. For example, the laser speed detector 130 is utilized to detect a speed of a vehicle 134 located a distance from the detector 130 (such as a range distance, $d_{RANGE}$) as discussed with reference to FIG. 1 and the camera 140 functions to capture an image of the vehicle 134 in response to a capture or trigger signal from the portable field processor 110.

The portable field processor 110 is configured similarly as in the system 100 but further includes a stop sign enforcement module 710 (which may be integrated with system coordinator 118 or may be provided by configuring the system 700 and processor 110 and its software according to the following description) that typically includes the operating software, program, and/or routines used by the processor 110 in determining when a stop sign violation has occurred and in response, initiating an image capture or trigger signal by the system coordinator 118 to the digital camera 140. As with the system 100, the detector 130 and camera 140 are preferably synchronized such that an image captured by the camera 140 is of a vehicle 134 that is determined to be traveling at a detected speed (e.g., a speed over a capture speed threshold).

Because certain functionalities are not required for stop sign enforcement, some components of the system 100 may be left out of the system 700 (or if one unit is used and marketed for all functionalities of the invention, these components can be provided but not actively utilized during stop sign enforcement). For example, the wireless output 174 and remote field receiver 180 typically would not be required in the system 700 as the enforcement session data is typically downloaded to a base station 160 (but in some cases, the session data may be transmitted using a wireless output, such as device 174, to the base station 160 such as when the processor 110 is relatively permanently positioned at a location for stop sign enforcement). The vehicle classification sensor 170 is not shown in system 700 as generally stop sign laws apply equally to all vehicle types (but may be included for stop signs that require commercial vehicles, including busses, to stop but not private vehicles, such as at some railroad crossings). Hence, the system 700 may be simplified in functionality and configuration compared to the system 100. Generally, prior to operation, the system 700 is positioned within a vehicle, such as a van or other vehicle, or other support and protective enclosure (such as a shed or portable trailer) that is itself positioned nearby a particular stop sign within the effective range of the detector 130 and camera 140. The system 700 may be positioned as shown in FIG. 7 behind the stop sign 720 so as to capture a frontal image of the vehicle 134, or alternatively, may be positioned in front (e.g., down the road on the side of the sign 720 displaying the print, symbols, or lights) of the stop sign 720 so as to capture an image of the rear portion of the vehicle 134.

Figure 8:
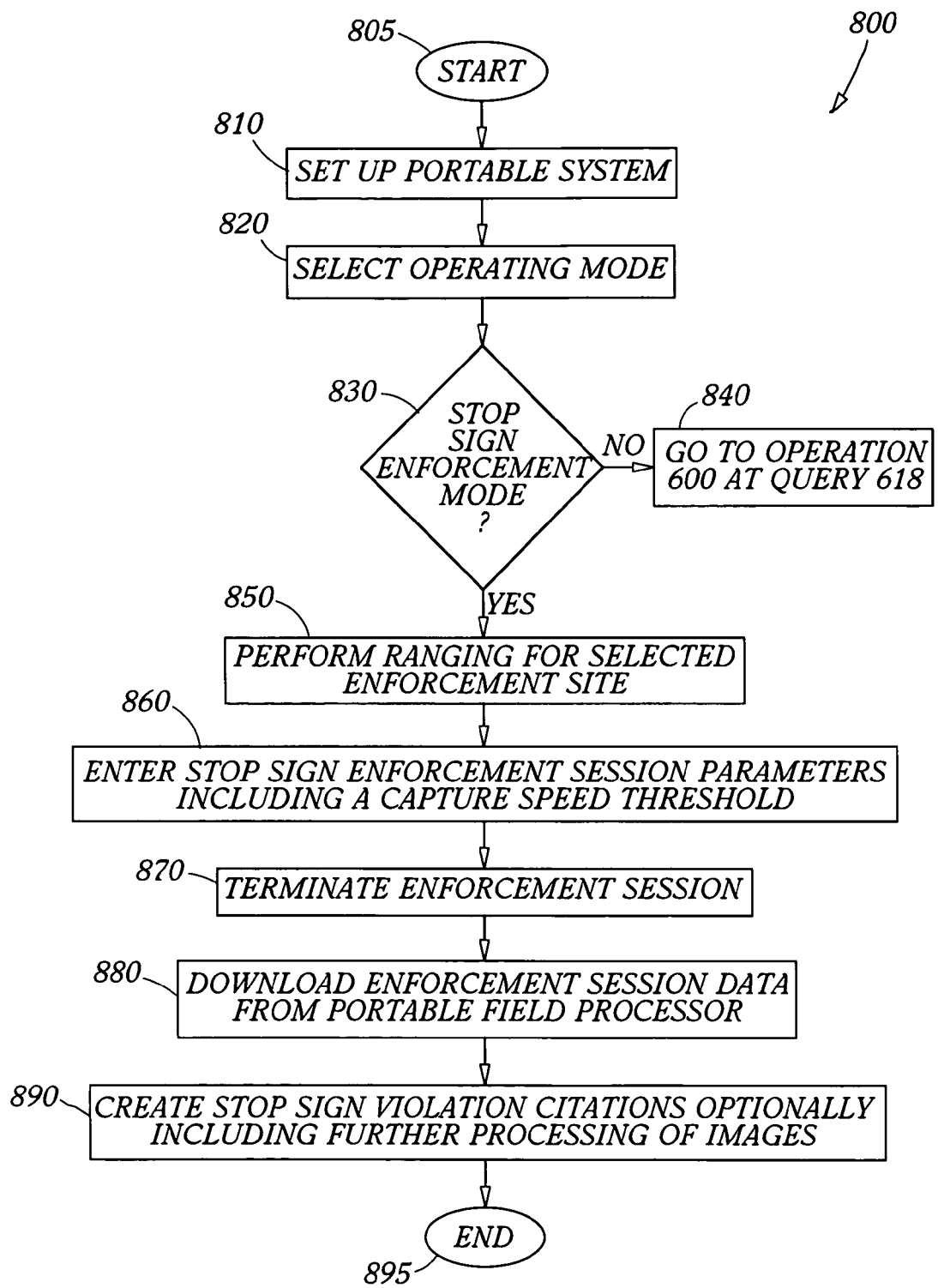
FIG. 8 is a flow diagram illustrating the acts and features of operating the speed measurement and image capture system of FIG. 7 to capture and process images of vehicles determined by the system to be violating a stop sign or other sign or signal requiring a vehicle to stop at specific location.

To fully explain operations of the system 700 and its unique features, it may be useful to describe the system 700 in conjunction with one exemplary operating procedure 800 shown in FIG. 8. The operating process 800 is started at 805 generally by providing the stop sign enforcement module 710 in the portable field processor 110 or otherwise providing the software in the system coordinator 118 (or elsewhere) to perform the processing functions described within the operating procedure 800. At 810, the portable system 700 including the processor 110, the detector 130, and camera 140 are set up in the field to detect stop sign violators (e.g., violators of traffic signals that require stopping a vehicle) and capture information for proving such violation of the posted signage. The initial set up, as with step 610 of process 600 in FIG. 6, may involve a number of steps such as the mounting of the system 700 on the bracket 320 and/or tripod 330 or other support structure and generally involves selecting an enforcement site or location at which to monitor vehicle traffic relative to a particular stop sign 720. Again, although FIG. 7 illustrates one location for the detector 130 and camera 142, other locations may be utilized to practice the method 800 including, but not limited to, positioning the detector 130 and camera 140 in front of the sign 720 typically on the same side of the lane 724 as the sign to have a line of sight to the front of the sign 720 and the rear of vehicles 134 in the enforcement window 736 adjacent the sign 720 in the lane 724.

Once an enforcement site is chosen, the system 700 is generally positioned adjacent a road (or lane 724 of a road) a particular distance, $d_{RANGE}$, from the stop sign, such as along (e.g., down traffic or up traffic) the road with an unobstructed view of the back (or front) of the stop sign 720 and the lane 724 adjacent the stop sign 720, i.e., where a vehicle 134 is required to stop for a period of time and labeled an enforcement or measurement window 736 in FIG. 7. The set up location for the portable field processor 110, laser speed detector 130, and camera 140 is determined by line of sight and distance considerations given optimum conditions associated with normal laser detector 130 and camera 140 usage. Typically, the distance or range, $d_{RANGE}$, is dictated by the optimum range of the camera lens 142 to ensure clear and identifiable images for reading license plates in captured images and subsequent citation or ticket creation at 890.

At 820, the operator of the system 700 is requested via a menu or the like on the screen 112 (or other input point or feature) of the processor 110 to select an operating mode. The modes may include those discussed relative to process 600 and step 614 and, in the system 700, further include a stop sign enforcement mode (or the "mode" may be implied by an operator configuring the system 700 according to the method 800 with no actual mode selection provided to an operator). The stop sign enforcement mode may coincide with a standard automatic mode for some units in which images are automatically captured along with speed detector data when a capture speed threshold (or capture level) is exceeded except that the stop sign threshold is typically set much lower than previously discussed capture levels or speeds, i.e., a set amount in excess of a posted speed limit.

At 830, the system coordinator 118 determines whether the stop sign enforcement mode was selected in the menu or otherwise at 820 (or again, the "mode" may be implied by the settings selected by operator). If a different mode is selected, operation 800 continues at 840 with transfer of the process or operations by the system coordinator 118 to the process 600 and capture mode query 618. If the stop sign enforcement mode is selected and identified at 830, operation 800 of the system 700 is continued by operation of the coordinator 118 in conjunction with the stop sign enforcement module 710 of the portable field processor 110. More particularly, the processor 110 is programmed for a particular enforcement window 736 and speed threshold.

At 850, ranging is performed for the system 700 for the particular enforcement site, which may be behind the sign 720 as shown in FIG. 7 or in front of the sign 720, which dictates the positioning of the detector 130 and camera 140 relative to a stop sign 720. The ranging distance, $d_{RANGE}$, is generally measured from the stop sign 720, such as the back side (or front side) of the stop sign, to the laser speed detector 130 and/or the lens 142 of the camera 140. Ranging at 850 is performed by aiming the laser speed detector 130 at the back (or front) of the stop sign 720 (or to a post or other portion of the sign or signal) being monitored by the system 700. The laser speed detector 130 preferably can then be set to detect speeds of vehicles 134 with this determined distance, $d_{RANGE}$, from the detector 130 and to display this distance, $d_{RANGE}$, for entering into the processor 110 as an enforcement parameter at 860 (e.g., programmed into the processor 110 as the measurement distance for downloading to the base station 160). The space or area adjacent the stop sign 720 in the lane 724 can be thought of or labeled the enforcement window or range 736 that is adjacent and generally behind the sign 720 and is the point or area where a vehicle 134 will violate stop sign laws (or where an infraction will occur).

Typically, the laser speed detector 130 is operable for a window or set of distances beyond the measurement distance, $d_{RANGE}$, and will operate effectively for measuring speeds within this measurement, capture, or enforcement window 736. For example, the detector 130 may be configured to have a 10-foot or larger (or smaller) window 736 such that if the measurement or ranging distance, $d_{RANGE}$, was determined to be 60 feet the laser speed detector 130 would target vehicles 134 that are 60 to 70 feet from the detector 130 and ignore all targets or vehicles 134 outside this measurement or capture window 736. This enables the detector 130 to measure the speed of a single target (as 2 vehicles typically will not fit within a single 10-foot enforcement window 736) within the enforcement area in the lane 724 in front of the sign 720. As discussed previously with respect to system 100, preferably the camera 140 is selected to have a range that coincides with the enforcement distance, $d_{RANGE}$, and more particularly, the lens 142 is automatically or manually adjusted to focus at a distance corresponding to the enforcement distance, $d_{RANGE}$, or within the corresponding enforcement window 736 adjacent and in front of the sign 720 in the lane 724. Note, the enforcement distances and sizes of the window 736 may be varied in practicing the invention with the examples above provided for illustration purposes and not as limitations to the invention.

At 860, the operator of the system 700 is requested via a data entry screen 112 to enter stop sign enforcement session parameters including a capture speed threshold. The parameters may vary but will typically include information useful for inclusion in the captured image file (such as in the header of a JPEG file and, for example, see information portion 208 of display 200 in FIG. 2) and/or for use in preparing or supporting a ticket or citation prepared based on a detected stop sign violation. This information may include operator name, an operator ID, an enforcement site and stop sign location, the type of sign being monitored, weather conditions (which may effect camera 140 settings/operation), the camera 140 and/or detector 130 identifiers, and, significantly, the capture or enforcement speed threshold (or capture level).

Also, at 860, the system 700 is set to automatically capture (i.e., placed in an auto-capture mode) violators of the monitored stop sign 720. According to one feature of the system 700, the stop sign enforcement module 710 (or system coordinator 118 or other software or hardware in processor 110) is adapted for determining when a vehicle 134 violates the stop sign law (i.e., runs the stop sign 720) by comparing a speed of the vehicle 134 detected by the laser speed detector 130 to a capture speed threshold. The capture speed threshold may be a default value (such as up to 10 mph or more) or may be entered by the operator 860 to comply with policies, regulations, and/or laws in force at the enforcement site (i.e., to comply with local, county, state, and/or national standards or rules). Typically, a capture speed threshold will be input at 860 based on standards set by the agency for which the operator is working and will be set to establish reasonable and fair thresholds for identifying violators of a stop sign 720, e.g., a vehicle traveling at 10 mph or higher is unlikely to be able to stop within the enforcement window 736.

Once the capture speed threshold is entered, the system 700 can be operated to monitor the stop sign 720 and automatically capture images and data for violating vehicles 134. As part of 860, the laser detector 130 is aimed at about the middle of the lane 724 and the system 700 is instructed to or switched to an automatic capture mode (such as by selecting a button on a menu of display 112). This automatic mode of stop sign enforcement involves continuous operation of the laser speed detector 130 to detect vehicle speeds and, at least periodically, to operate the synchronized digital camera 140 to capture images of violating vehicles 134 (i.e., vehicles 134 traveling at detected speeds above the set or default threshold).

As discussed above with regard to FIGS. 1–6, the camera 140 operates to capture images based on signals from the portable field processor 110. Preferably, the camera 140 operates in synchronization with the speed detection by the detector 130 and does so in one of the manners described for system 100. The camera 140 generally captures an image having a width, $w_{CAPTURE}$, that preferably includes the stop sign 720 and the lane 724 but which may be narrower so as to capture all or a portion of the vehicle 134 in the lane 724. This enables the camera 140 to capture an image of the stop sign 720 that is being violated and the entire front or rear portion of the vehicle 134 (or at least the license plate of the vehicle 134), including the license plate and, in some cases, the windshield and image of the drivers of the vehicle 134 when the system 700 is arranged as shown in FIG. 7 to capture frontal images of vehicles 134. The camera 140 is preferably aligned with the detector 130 to capture images corresponding generally with the speed detection location, i.e., the enforcement window 736 relative to the sign 720.

The trigger signal for the camera 140 is initiated by the module 710 based on a determination that the detected speed received by the processor 110 from the detector 130 is above the capture speed threshold. In other words, the system 700 acts to identify stop sign violators based on a vehicle 134 not stopping. According to the invention, a vehicle's failure to stop is determined by the vehicle 134 being determined to be traveling above a threshold speed adjacent the stop sign 720 within an enforcement window 736 adjacent the stop sign 720. A non-violating vehicle 134 (one traveling at a detected speed below or at the threshold) is assumed to be slowing down when entering the enforcement or measurement window of the detector 130 and then stopping (or going 0 mph). Hence, a fair threshold is one that assumes a relatively rapid reduction of speed within the enforcement window to avoid capturing images of vehicles 134 that stopped at the sign 720 but stopped quickly or within a relatively short distance (i.e., the length of the enforcement window 736). In this regard, a "fair" threshold value is generally in the range of 10 mph to 20 or more mph (at which speeds the vehicle 134 most likely would not be able to stop at the sign 720) with more conservative thresholds being set at the posted speed limits or percentages of the posted speed limits for the lane 724.

The following operating examples are provided to more fully describe operation of the system 700 in enforcing stop sign laws. In a first non-limiting example, the capture speed threshold is set at 10 mph and the measurement distance, $d_{RANGE}$, is determined to be 50 feet with a 10-foot window 736. The car 134 approaches the monitored stop sign 720 and rolls into the front end of the enforcement window (i.e., about 60 feet from the detector 130 and about 10 feet behind the stop sign 720) at a speed of 18 mph. The laser speed detector 130 functions to detect the speed and transmit a signal to the processor 110 and stop sign enforcement module 710 (or system coordinator 118 or other software/hardware of processor 110). The module 710 determines that the threshold of 10 mph is exceeded and transmits a trigger signal to the camera 140 which captures the image (such as by freezing its buffer or taking a picture within its image timing cycle).

The camera 140 transmits the image of the vehicle 134 to the processor 110. The image and enforcement information along with parameters are saved in memory 120 as a single digital file (as described in detail with reference to FIGS. 1–6) or as two or more files that are linked or otherwise matched to assure proper mating of images, enforcement information, and parameters. The single file or multiple files typically include an image of the vehicle 134 and its license plate and information for the file header including time and date of violation, a distance to the vehicle 134, and the detected speed of the vehicle 134. Note, again, the detector 130 and camera 140 may be positioned in front of the sign 720 such that the system 700 acts to detect a violation, to capture an image of the back portion of the vehicle 134 and, in some embodiments, the front of the sign, and enforcement parameters.

In a second example, the measurement distance, $d_{RANGE}$, determined in the ranging of step 850 is 60 feet, the measurement range of the detector 130 is 15 feet, and the capture speed threshold is entered at 860 to be 20 mph. When a vehicle 134 crosses the front (or distal) end of the measurement or enforcement window 736 (i.e., about 75 feet from the detector 130 and about 15 feet in front of the stop sign 720 in the lane 724) going 15 mph, the vehicle 134 is determined not to be violating the stop sign 720 and no image is captured. This is determined by the system 700 because the detector 130 targets the vehicle 134, determines the speed of 15 mph, and transmits a corresponding signal to the processor 110 and module 710. The module 710 compares the detected speed to the threshold and determines that no violation has occurred (or that the vehicle may stop at the sign 720) and does not transmit or initiate a trigger signal to the camera 140. Numerous other examples will be apparent to those skilled in the art with varying capture thresholds, enforcement window sizes and locations, and positions for the detector 130 and camera 140.

At 870, the enforcement session is terminated, such as by an enforcement officer or an operator switching off power to the system 700 or selecting a stop button on the display 112 or elsewhere on the processor 110. Termination can also be achieved by transmitting a termination signal from a remote device, such as a wireless transmission from the base station 160. At 880, the enforcement session data in memory 120 is downloaded from the processor 110. Typically, this is achieved by transporting the processor 110 (and, optionally, the detector 130 and camera 140) to the location of the base station 160 and wiring the processor 110 to the base station 160. Alternatively, the downloading may include removal of the memory 120 and then later insertion in the base station 160 for data transfer or include wired or wireless transmission of the data in memory 120 to the base station 160 (or another system) for further processing.

Of course, the data and images in the memory 120 can be viewed on the display 112 of the processor 110 by an operator prior to downloading to determine if downloading is required or useful. In some embodiments, the module 710 is further adapted to track numbers of violators or images in the memory 120, such as based on actual image numbers or percentage of memory 120 being utilized. In these embodiments, the module 710 (or other software/hardware in processor 110) may be configured to transmit an alarm or notification signal to the base station 160, such as by a wireless output device (not shown), when a certain number of images have been captured or percentage of the memory 120 has been utilized. Additionally, the module 710 or other components may operate to shut down monitoring operations at this point to avoid overwriting previously stored images. Automatic shutdown may also be instigated by the module 710 or coordinator 118 upon a low power level detection of battery system 126 (and such detection may also be accompanied by a warning or notification signal being transmitted by the processor 110 to the base station 160).

At 890, the downloaded data is processed to create stop sign or traffic signal violation citations, traffic tickets, or warnings that can be transmitted to the operator or owner of the vehicle 134. The processing may include magnifying or enlarging the display of the license plate or operator of the vehicle 134 and include other processing discussed with reference to FIGS. 1–6. Generally, the creation of the citation at 890 includes identifying license plate numbers in the captured images, matching registered owner information to the numbers (e.g., in a state's motor vehicle database), and printing a ticket including the owner's name and mailing address along with the violation (e.g., running a stop sign, failing to stop at a traffic light, and the like) and parameter (e.g., time and date and location) information.

In one embodiment of the system 700, the system 700 is utilized for monitoring violators of a traffic signal when the signal has turned red. In other words, the stop "sign" is a traffic signal or light. In this embodiment, the system 700 includes a wired or wireless input (not shown) for receiving a signal indicating the state or status of the traffic signal. The signal may be generated by a separate device useful for determining light status, such as a device with a camera and processor for determining the state of the signal. In one embodiment, the signal is received from the targeted or monitored traffic signal device itself, which provides signals to indicate when the traffic light is red and a signal from the traffic signal device when the traffic light is green again. The module 710 (or other components of processor 110) operates to only monitor signals from the laser speed detector 130 when the light is red as indicated by the signals from the traffic signal device. When the light is red, operation of the system 700 in this embodiment is similar to that described relative to FIGS. 7 and 8 with laser 130 and camera 140 generally directed to a particular lane 724 or particular lanes 724 (if more than one camera 140 and detector 130 are utilized in system 700).

In another embodiment of the system 700, the digital camera 140 positioned in front or back of the sign 720 is supplemented or replaced by a video camera to allow a short video, such as a 5 to 10 second clip, to be captured of the stop sign violation. In this embodiment, the video camera is triggered by the processor 110 as soon as a speed is detected by the detector 130 that is above the threshold as determined by the module 710 or other software/hardware of processor 110. In order to capture enough video footage, the system 700 may have to be adjusted to utilize a detector 130 with a larger measurement window or that has been set to detect a speed farther away from the stop sign (such as 20 to 50 feet in front of the stop sign 720 in the lane 724). In the earlier detection embodiment, the capture speed threshold would be set higher as the vehicle 134 would have a larger distance to stop. Alternatively, a second detector 130 may be provided that functions simply in detecting a possible violation by a vehicle 134 at a preset distance behind a stop sign 720. This second detector 130 would detect a speed above a threshold (the same or more likely higher than the capture speed threshold) and the module 710 would first trigger the video based on this comparison. Then, the second detector 130 would detect a second speed within the enforcement or measurement window discussed previously and if determined above the capture speed threshold, the module 710 would save the video footage or mark the video for later use in proving the violation and after a set time period, terminate operation of the video camera (or the camera may be programmed to only capture a set length of footage each time it is instructed to operate by the processor 110).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the system 100 can readily be used in daylight and at night with the addition of infrared and other flash devices or flood lighting.

Further, in one preferred embodiment, the portable field processor 110 is configured such the memory 120 or a separate memory (not shown) is readily removable. For example, it may be desirable that field officers or operators have their own processor 110 and simply exchange data at the end of shifts or the operators may simply have their own removable media and share the same processor 110. This can be achieved with removable storage media, such as compact disks, floppy disks, flash cards, portable USB storage devices, and the like. The memory 120 or other memory to support this removable media may be a separate data storage device linked (such as with USB port) to the processor 110. This configuration allows ready removal of data storage media and also facilitates field restoration of the application (system coordinator 118) if lost during field use (i.e., the application may be downloaded in the field by an operator).

We claim:

1. A system for field or onsite use in determining a failure of a vehicle to stop at a traffic sign or signal and capturing images of the vehicle, comprising:

a laser-based speed detector determining a speed of a vehicle in an enforcement window adjacent the sign or signal and in response, generating a speed signal;

a camera aligned with the speed detector capturing and storing an image of the vehicle, wherein the camera is adapted for operating in response to an image capture signal; and a portable field processor communicatively linked with the speed detector and the camera, wherein the portable field processor receives the speed signal from the speed detector, compares the speed signal to a capture speed threshold that is calculated by the processor as a percentage of a posted speed limit for a road lane passing through the enforcement window, and when the threshold is determined to be exceeded, transmits the image capture signal to the camera.

2. The system of claim 1, wherein the image is a digital-format still image of the vehicle stored by the camera in camera memory, wherein the camera responds to the image capture signal to generate and transmit a digital image file including the digital-format still image to the portable field processor, and wherein the portable field processor operates to create a combined speed and image data file by modifying the digital image file to include speed data from the speed signal.

3. The system of claim 2, wherein the digital image file is a JPEG-format file and the modifying includes inserting the speed data in a header of the JPEG-format file.

4. The system of claim 1, wherein the processor includes an input device receiving the capture speed threshold as inputted by an operator.

5. The system of claim 4, wherein the capture speed threshold is less than about 30 miles per hour.

6. The system of claim 5, wherein the capture speed threshold is selected from the range of about 10 to about 20 miles per hour.

7. The system of claim 1, wherein the camera continuously captures and stores images including one image per image timing cycle, and wherein the portable field processor synchronizes operation of the detector and the camera by transmitting the image capture signal within the image timing cycle in which the one image is the capture image of the vehicle.

8. The system of claim 1, wherein the enforcement window has a front end positioned in a road lane adjacent the sign and about 10 to 20 feet from the sign as measured in the lane away from the sign in a direction opposite traffic flow in the lane.

9. A method of determining violation by a vehicle of a traffic sign or signal that requires the vehicle to stop and capturing a digital image of the vehicle, comprising:

positioning a speed detector and a camera at a location selected relative to the traffic sign or signal for monitoring vehicle traffic through an enforcement window in a road lane adjacent the traffic sign or signal, wherein the positioning includes performing ranging of the speed detector including first aiming the speed detector at the traffic signal, operating the speed detector to determine a measurement distance from the speed detector to the traffic sign or signal, and second aiming the speed detector at a central portion of the road lane;

operating the camera on an ongoing basis to capture still images of vehicles passing through the enforcement window and to store the still images at least temporarily in memory;

determining the speed of a targeted vehicle in the enforcement window with the speed detector;

transmitting the speed from the speed detector to a portable field processor;

processing the speed with the portable field processor to determine whether a capture speed threshold has been exceeded and when determined exceeded, transmitting a trigger signal to the camera; and at the camera, receiving the trigger signal, retrieving a still image corresponding to the targeted vehicle from memory, and transmitting the still image in a digital image file to the portable field processor.

10. The method of claim 9, further including processing the digital image file with the portable field processor to insert or link the speed.

11. The method of claim 10, further including displaying the processed digital image file on a display of the portable field processor.

12. The method of claim 9, further including operating the camera to provide charging power to the portable field processor to protect the speed and the digital image file at the portable field processor.

13. The method of claim 9, further including prior to the operating and determining, entering traffic sign or signal enforcement parameters including the capture speed threshold.

14. The method of claim 13, further including operating the portable field processor to create a combined digital image file by writing select portions of the traffic sign or signal enforcement parameters including the speed into the digital image file.

15. The method of claim 9, wherein the capture speed threshold is selected from the range of 10 to 20 miles per hour.

16. The method of claim 9, wherein the capture speed threshold is calculated as a percentage of a posted speed limit for the road lane.

17. A system for use in determining a failure of a vehicle to stop at a traffic sign or signal and for capturing images of the vehicle, comprising:

means for determining a speed of a vehicle in an enforcement window adjacent the sign or signal and in response, generating a speed signal, wherein the speed determining means comprises a laser-based speed detector and wherein the speed detector is configured for initial ranging including first aiming the speed detector at the traffic signal, operating the speed detector to determine a measurement distance from the speed detector to the traffic sign or signal, and second aiming the speed detector at a central portion of a road lane in the enforcement window;

means aligned with the speed determining means for capturing and storing a video image of the vehicle for a measurement window, wherein the video image means is adapted for operating in response to an image capture signal; and processing means communicatively linked with the speed determining means and the video image means for receiving the speed signal, comparing the speed signal to a capture speed threshold, determining when the threshold is exceeded, and transmitting the image capture signal to the video image means.

18. The system of claim 17, wherein the processing means further generates speed data based on the speed signal and wherein the processing means further matches the speed data with the video image.

19. The system of claim 17, wherein the video image comprises a 10 second or shorter video clip of the enforcement window including an image of the vehicle and wherein the video image means responds to the image capture signal to generate and transmit a video image file comprising the video clip to the processing means.

20. A system for field or onsite use in determining a failure of a vehicle to stop at a traffic sign or signal and capturing images of the vehicle, comprising:

a laser-based speed detector determining a speed of a vehicle in an enforcement window adjacent the sign or signal and in response, generating a speed signal, wherein the speed detector is configured for initial ranging including first aiming the speed detector at the traffic signal, operating the speed detector to determined a measurement distance from the speed detector to the traffic sign or signal, and second aiming the speed detector at a central portion of a road lane in the enforcement window;

a camera aligned with the speed detector capturing and storing an image of the vehicle, wherein the camera is adapted for operating in response to an image capture signal; and a portable field processor communicatively linked with the speed detector and the camera, wherein the portable field processor receives the speed signal from the speed detector, compares the speed signal to a capture speed threshold when the threshold is determined to be exceeded, transmits the image capture signal to the camera.

21. The system of claim 20, wherein the image is a digital-format still image of the vehicle stored by the camera in camera memory, wherein the camera responds to the image capture signal to generate and transmit a digital image file including the digital-format still image to the portable field processor, and wherein the portable field processor operates to create a combined speed and image data file by modifying the digital image file to include speed data from the speed signal.

22. The system of claim 20, wherein the processor includes an input device receiving the capture speed threshold as inputted by an operator.

23. The system of claim 22, wherein the capture speed threshold is less than about 30 miles per hour.

24. The system of claim 20, wherein the camera continuously captures and stores images including one image per image timing cycle, and wherein the portable field processor synchronizes operation of the detector and the camera by transmitting the image capture signal within the image timing cycle in which the one image is the capture image of the vehicle.

25. The system of claim 20, wherein the enforcement window has a front end positioned in a road lane adjacent the sign and about 10 to 20 feet from the sign as measured in the lane away from the sign in a direction opposite traffic flow in the lane.

26. A method of determining violation by a vehicle of a traffic sign or signal that requires the vehicle to stop and capturing a digital image of the vehicle, comprising:

positioning a speed detector and a camera at a location selected relative to the traffic sign or signal for monitoring vehicle traffic through an enforcement window in a road lane adjacent the traffic sign or signal;

operating the camera on an ongoing basis to capture still images of vehicles passing through the enforcement window and to store the still images at least temporarily in memory;

determining the speed of a targeted vehicle in the enforcement window with the speed detector;

transmitting the speed from the speed detector to a portable field processor;

processing the speed with the portable field processor to determine whether a capture speed threshold has been exceeded and when determined exceeded, transmitting a trigger signal to the camera;

at the camera, receiving the trigger signal, retrieving a still image corresponding to the targeted vehicle from memory, and transmitting the still image in a digital image file to the portable field processor; and operating the camera to provide charging power to the portable field processor to protect the speed and the digital image file at the portable field processor.

27. A method of determining violation by a vehicle of a traffic sign or signal that requires the vehicle to stop and capturing a digital image of the vehicle, comprising:

positioning a speed detector and a camera at a location selected relative to the traffic sign or signal for monitoring vehicle traffic through an enforcement window in a road lane adjacent the traffic sign or signal;

operating the camera on an ongoing basis to capture still images of vehicles passing through the enforcement window and to store the still images at least temporarily in memory;

determining the speed of a targeted vehicle in the enforcement window with the speed detector;

transmitting the speed from the speed detector to a portable field processor;

processing the speed with the portable field processor to determine whether a capture speed threshold has been exceeded and when determined exceeded, transmitting a trigger signal to the camera, wherein the capture speed threshold is calculated as a percentage of a posted speed limit for the road lane; and at the camera, receiving the trigger signal, retrieving a still image corresponding to the targeted vehicle from memory, and transmitting the still image in a digital image file to the portable field processor.

28. The method of claim 27, further including processing the digital image file with the portable field processor to insert or link the speed.

29. The method of claim 28, further including displaying the processed digital image file on a display of the portable field processor.

30. The method of claim 27, further including operating the camera to provide charging power to the portable field processor to protect the speed and the digital image file at the portable field processor.

31. The method of claim 27, further including prior to the operating and determining, entering traffic sign or signal enforcement parameters including the capture speed threshold.

32. The method of claim 31, further including operating the portable field processor to create a combined digital image file by writing select portions of the traffic sign or signal enforcement parameters including the speed into the digital image file.

33. The method of claim 27, wherein the positioning includes performing ranging of the speed detector including first aiming the speed detector at the traffic signal, operating the speed detector to determine a measurement distance from the speed detector to the traffic sign or signal, and second aiming the speed detector at a central portion of the road lane.

* * * * *

UNITED STATES PATENT AND TRADEMARK OFFICE
CERTIFICATE OF CORRECTION

PATENT NO. : 6,985,827 B2
DATED : January 10, 2006
INVENTOR(S) : David W. Williams et al.

It is certified that error appears in the above-identified patent and that said Letters Patent is hereby corrected as shown below:

<u>Column 28,</u>
Line 19, "determined" should be -- determine --.
Line 32, after "threshold" (first occurrence) add -- , and --.

Signed and Sealed this

Fourth Day of April, 2006

JON W. DUDAS
*Director of the United States Patent and Trademark Office*